US008977065B2

(12) United States Patent
Rossato et al.

(10) Patent No.: US 8,977,065 B2
(45) Date of Patent: Mar. 10, 2015

(54) INHERITANCE IN A TIERED SIGNAL QUALITY HIERARCHY

(76) Inventors: Luca Rossato, Milan (IT); Guido Meardi, Milan (IT)

( * ) Notice: Subject to any disclaimer, the term of this patent is extended or adjusted under 35 U.S.C. 154(b) by 629 days.

(21) Appl. No.: 13/188,188

(22) Filed: Jul. 21, 2011

(65) Prior Publication Data

US 2013/0294704 A1 Nov. 7, 2013

(51) Int. Cl.
*G06K 9/36* (2006.01)
*G06T 9/40* (2006.01)
*H04N 19/33* (2014.01)

(52) U.S. Cl.
CPC ............ *G06T 9/40* (2013.01); *H04N 19/00436* (2013.01)
USPC ...... 382/232; 382/237; 382/238; 375/240.16; 375/240.25

(58) Field of Classification Search
CPC ............... G06T 9/40; H04N 19/00436; H04N 19/00448; H04N 19/0096; H04N 19/004; H04N 19/00569; H04N 19/00733; H04N 19/00806; H04N 19/00818; H04N 19/00909; H04N 19/00921; H04N 19/0096; H04N 19/00757; H04N 19/00824
USPC ........... 382/232, 233, 23; 375/240.25, 240.16
See application file for complete search history.

(56) References Cited

U.S. PATENT DOCUMENTS

| | | | | |
|---|---|---|---|---|
| 5,155,594 A | * | 10/1992 | Bernstein et al. | 375/240.14 |
| 5,293,230 A | | 3/1994 | Golin | |
| 5,754,766 A | * | 5/1998 | Shaw et al. | 709/200 |
| 6,212,304 B1 | * | 4/2001 | Durg et al. | 382/254 |
| 6,381,369 B1 | * | 4/2002 | Kondo | 382/238 |
| 7,113,227 B1 | * | 9/2006 | Kakuya et al. | 348/678 |
| 7,117,217 B2 | * | 10/2006 | Ooi et al. | 1/1 |
| 7,876,833 B2 | | 1/2011 | Segall et al. | |
| 8,214,371 B1 | * | 7/2012 | Ramesh et al. | 707/743 |
| 8,406,546 B2 | * | 3/2013 | Liu et al. | 382/239 |
| 8,471,874 B2 | * | 6/2013 | Sato et al. | 345/690 |
| 8,531,321 B1 | * | 9/2013 | Rossato et al. | 341/51 |
| 2010/0141489 A1 | * | 6/2010 | Reznik | 341/67 |
| 2010/0310185 A1 | * | 12/2010 | Liu et al. | 382/239 |
| 2010/0310186 A1 | * | 12/2010 | Liu et al. | 382/239 |
| 2013/0297466 A1 | * | 11/2013 | Rossato et al. | 705/30 |

(Continued)

OTHER PUBLICATIONS

Kim, Y.M. et al., "New Method for Representing Linear Quadtree", Electronics Letters, Jan. 19, 1989, Total pp. 3, vol. 25 No. 2, IEE Stevenage, Great Britain.*

(Continued)

*Primary Examiner* — Mekonen Bekele
(74) *Attorney, Agent, or Firm* — Chapin IP Law, LLC

(57) ABSTRACT

A first set of reconstruction data includes a symbol specifying an attribute setting of a parent element in a rendition of the signal at a first level of quality. The attribute setting can be one of multiple attribute settings of the parent element indicating how to configure the parent element for the rendition of the signal at a first level of quality. A signal processor divides the parent element into multiple sub-elements to reconstruct the signal at a second, higher level of quality. The signal processor utilizes the rendition of the signal at the first level of quality and the attribute setting of the parent element as specified by the symbol (at the first level of quality) to produce a default attribute setting for one or more respective sub-elements (into which the parent element is divided) unless reconstruction data to reconstruct the signal at a higher level of quality specifies a different attribute setting for the respective sub-elements.

41 Claims, 14 Drawing Sheets

(56) References Cited

U.S. PATENT DOCUMENTS

2013/0314496 A1* 11/2013 Rossato et al. .................. 348/43
2013/0322537 A1* 12/2013 Rossato et al. ........... 375/240.16

OTHER PUBLICATIONS

Weiwei, You et al., "An Adaptive Interpolation Scheme for Inter-layer Prediction", Circuits and Systems, 2008, Total pp. 4, IEEE, New Jersey.*

Hunter, Andrew et al., "Breadth-First Quad Encoding for Networked Picture Browsing", Computer and Graphics, 1989, Total pp. 14, vol. 13 No. 4, Pergamon Press, Great Britain.*

Chee, Y-Kheong, "Survey of Progressive Image Transmission Methods", International Journal of Imaging Systems and Technology, 1999, Total pp. 17, vol. 10 No. 3-19, John Wiley and Sons, New York.

Song, In-Wook et al., "Progressive Compression of Point Texture Images", Visual Communications and Image Processing, 2004, Total pp. 10, vol. 5308, SPIE-IS&T, Washington.

Howard, Paul G. et al., "Arithmetic Coding for Data Compression", Proceedings of the IEEE, Jun. 1994, Total pp. 10, vol. 82 No. 6, IEEE, New York.

Kotera, Hiroaki et al., "A Novel Coding Algorithm for Representing Full Color Image by a Function of Single Color Image" The Sixth International Congress on Advances in Non-Impact Printing Technologies, Oct. 21-26, 1990, Total pp. 13, IS&T, Orlando.

Yamaguchi, Hirohisa, "Efficient Encoding of Colored Pictures in R, G, B Components", IEEE Transactions on Communications Nov. 1984, Total pp. 14, vol. COM-32 No. 11, IEEE, New York.

International Search Report from corresponding PCT application No. PCT/IB2012/053660, mailed Jan. 9, 2013, Total pp. 6.

* cited by examiner

| 910-1 10 | 910-2 8F |
|---|---|
| 910-3 0F | 910-4 0 |

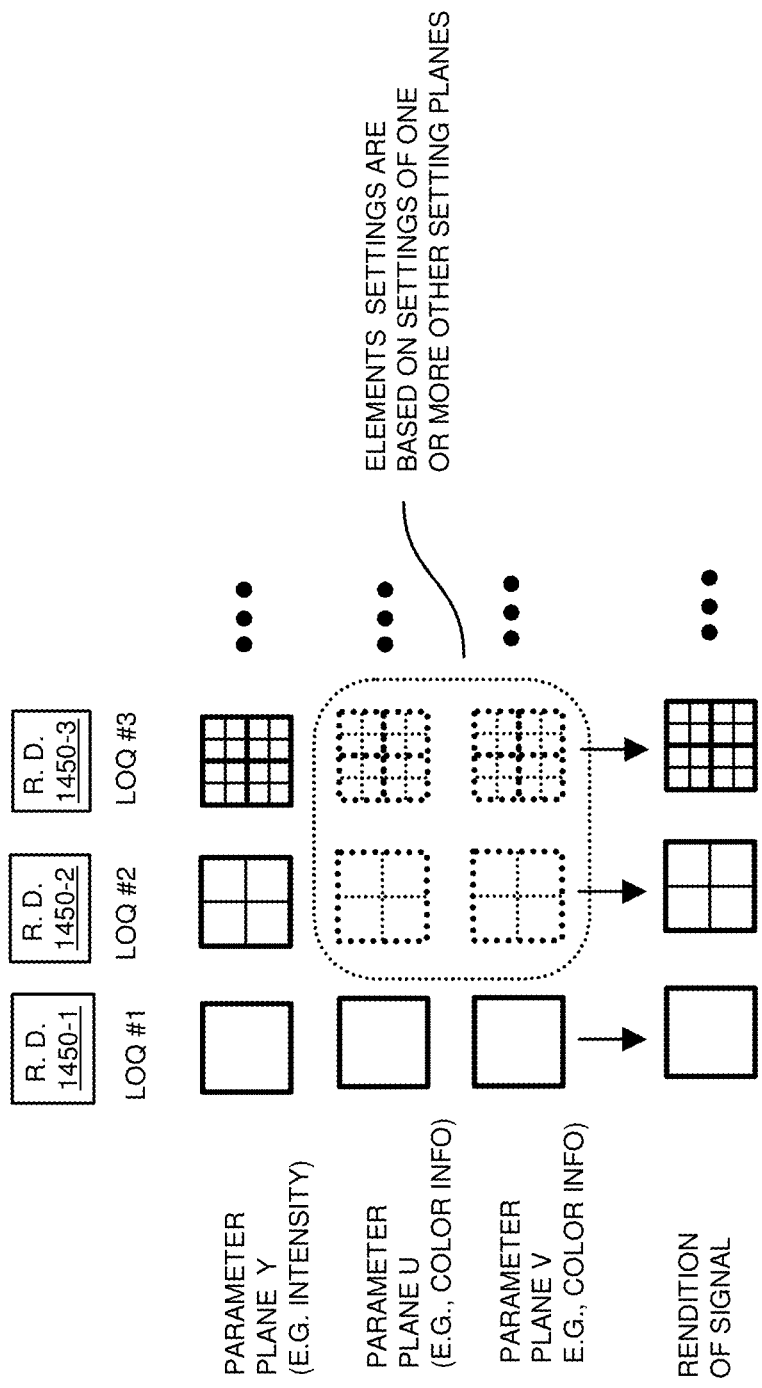

US 8,977,065 B2

INHERITANCE IN A TIERED SIGNAL QUALITY HIERARCHY

RELATED APPLICATIONS

This application is related to U.S. patent application Ser. No. 13/188,201, entitled "TIERED SIGNAL DECODING AND SIGNAL RECONSTRUCTION,", filed on the same day as the present application, the entire teachings of which are incorporated herein by this reference.

This application is related to U.S. patent application Ser. No. 13/188,207 entitled "SIGNAL PROCESSING AND TIERED SIGNAL ENCODING,", filed on the same day as the present application, the entire teachings of which are incorporated herein by this reference.

This application is related to U.S. patent application Ser. No. 13/188,220 entitled "UPSAMPLING IN A TIERED SIGNAL QUALITY HIERARCHY,", filed on the same day as the present application, the entire teachings of which are incorporated herein by this reference.

This application is related to U.S. patent application Ser. No. 13/188,226 entitled "SIGNAL PROCESSING AND INHERITANCE IN A TIERED SIGNAL QUALITY HIERARCHY,", filed on the same day as the present application, the entire teachings of which are incorporated herein by this reference.

This application is related to U.S. patent application Ser. No. 13/188,237 entitled "TRANSMISSION OF RECONSTRUCTION DATA IN A TIERED SIGNAL QUALITY HIERARCHY,", filed on the same day as the present application, the entire teachings of which are incorporated herein by this reference.

BACKGROUND

CPU (Central Processing Unit) efficiency matters both during encoding and decoding of a signal. Latest generation processors are becoming more and more parallel, with up to hundreds of simple cores on each single chip.

Unfortunately, by nature, traditional MPEG (Moving Pictures Expert Group) family codecs are structurally non-parallel. That stems from the fact that they are block-based, and each image block must be encoded and decoded sequentially, since to achieve efficient compression all blocks must be made to depend in some way on each other.

Via the introduction of so-called "slices" (basically, pieces of the image that are treated independently of one another, as if they were separate videos put one next to the other) into MPEG coding, the H.264 standard allows for processing of a few threads in parallel (typically 2 or 3 threads). Important algorithm elements such as de-blocking (i.e., a filter that "smoothes" the transitions among blocks to create a more uniform image) are typically global operations full of conditional instructions, which are unsuitable for applications including parallel CPUs.

Today's CPUs and GPUs (Graphics Processing Units) are typically very powerful; a single GPU can include several hundreds of computing cores to perform parallel processing of information. When using current technology, larger portions of an image can be stored in a processor cache for processing. The need to fragment images into a multitude of small blocks, which was a driving factor when MPEG was created, as processors from that era could only deal with very small chunks of video data at a time—and then only sequentially—no longer applies to modern CPUs and GPUs. Thus, a large portion of available processing power may go unused when implementing MPEG-like types of encoding/decoding, with blocking artifacts needlessly introduced into the signal.

Also, compared to what was current when MPEG was developed, modern day applications typically require much higher definition video encoding and much higher overall playback quality. In high-definition (HD), high-quality videos, there is a much larger difference between areas with low detail (potentially even out of focus) and areas with very fine detail. This makes the use of frequency-domain transforms such as those used in MPEG even more unsuitable for image processing and playback, since the range of relevant frequencies is getting much broader.

In addition, higher resolution images include a higher amount of camera noise and/or film grain, i.e., very detailed high-frequency pixel transitions that can be quite irrelevant for viewing and require many bits to encode.

Lastly, traditional codecs are ill-suited to perform efficiently with 3D or volumetric imaging, which is becoming more and more important in fields such as medical imaging, scientific imaging, etc.

Most target devices today support different playback resolutions and quality. So-called SVC (Scalable Video Coding), the current MPEG standard for scalability, has not been received favorably by the industry and shows little to non-existent adoption, because it is considered way too complex and somewhat bandwidth inefficient. Moreover, encoded videos are plentiful; that is, a content provider typically doesn't have the time to customize encoder parameters and experiment with each specific video stream. Currently, content providers dislike that many encoding parameters must be manually tweaked (every time performing an encoding and checking the quality of results) in order to successfully encode a video.

As an alternative to MPEG standards for encoding/decoding, so-called image pyramids have been used for encoding/decoding purposes. For example, using Laplacian pyramids, conventional systems have created lower resolution images using Gaussian filters and then building the pyramid of the differences between the images obtained by upsampling with a rigidly programmed decoder back from the lower resolution levels to the original level.

Use of conventional Laplacian pyramid encoding has been abandoned. One deficiency of such transforms is that the authors were always trying to avoid distortions/artifacts in the downsampled image, so they typically used Gaussian filtering, as it is the only type of filter that doesn't add any information of its own. However, the insurmountable problem with Gaussian filtering is that it introduces a blurring effect, such that when upscaling back to higher resolutions, there is a need for an inordinate amount of image correction information to reproduce the original image. In other words, upsampling with conventional filters results in jagged or blurry edges in a reconstructed image. The jagged or blurry edges need to be corrected using a substantial amount of residual data, making such an encoding technique undesirable for use in higher resolution applications.

BRIEF DESCRIPTION

Embodiments herein deviate with respect to conventional systems and methods to reduce an amount of reconstruction data needed to reconstruct a signal with desirable accuracy. For example, embodiments herein are directed to unique ways of inheriting information from one level in a hierarchy to the next.

More specifically, one embodiment herein includes a signal processor such as a decoder configured to reconstruct a signal at higher levels of quality in a hierarchy. The signal processor receives a first set of reconstruction data to reconstruct the signal at a first level of quality in the hierarchy. Assume that the first set of reconstruction data includes a symbol specifying an attribute setting of a parent element in the rendition of the signal at the first level of quality. The attribute setting can be a setting for one of multiple planes of attribute settings of the parent element (e.g., attribute settings can include color components in a suitable color space, coordinates of motion vectors, temperature values, radioactivity values, density values, etc.). A combination of attribute settings indicates how to configure the parent element for the rendition of the signal at a first level of quality. The signal processor divides the parent element into multiple sub-elements to reconstruct the signal at a second, higher level of quality. When doing so, the signal processor utilizes the attribute setting of the parent element as specified by the symbol (at the first level of quality) to produce a default attribute setting for one or more respective sub-elements (into which the parent element is divided) unless or until a second set of reconstruction data to reconstruct the signal at the second level of quality specifies a different attribute setting for the respective sub-element. Accordingly, embodiments herein include reuse of parent setting information when reconstructing a signal at one or more higher levels of quality. This technique can reduce an amount of data needed to define the signal because of the inheritance of setting information from one level of quality to the next.

In accordance with further embodiments, a symbol (e.g., setting information) assigned to the parent element can be encoded in a way as to specify that each of its subdivisions or sub-elements (e.g., the multiple sub-elements and all further divisions of the multiple sub-elements into smaller sub-elements at higher levels of quality) are assigned a same attribute setting as indicated by the symbol assigned to the parent element at the first level of quality. In such an instance, because of inheritance, setting information need not be repeated at higher levels of quality.

As will be discussed further herein, a symbol assigned to a parent element can be encoded in a manner so as to specify which of multiple class types the parent element belongs to. For example, the symbol assigned to the parent element can be one of multiple different symbols specifying a class type.

In one embodiment, assigning a symbol to the parent element can indicate that the parent element belongs to the first class and that one or more strings of reconstruction data to reconstruct the signal at levels of quality higher than the first level of quality do not include a transmission of a duplicate symbol (e.g., the same symbol assigned to the parent element) since the assigned symbol indicates that each of the multiple sub-elements and all further divisions of the multiple sub-elements into smaller sub-elements of the parent element at higher levels of quality are to inherit the attribute setting of the parent. In other words, inheritance information assigned to a parent element at a lower level of quality can indicate that each of one or more sub-elements (as derived from the parent element) can be assigned the same symbol as the parent element. In such an instance, there is no need to retransmit the settings for the sub-elements at the higher levels of quality unless the settings happen to change for the higher levels of quality. In such an instance, the signal can include information indicating the settings for any sub-elements derived from a respective parent element.

As an alternative to being assigned a first symbol, a parent element can be assigned a second symbol. The second symbol also can indicate a class to which a corresponding element belongs. Each of the first symbol and second symbol can indicate that the parent element belongs to the same class. However, unlike the first symbol, which indicates inheritance by the respective sub-elements, assignment of the second symbol to the parent element can indicate that none of the subdivisions of the parent element into smaller elements necessarily inherits the attribute information assigned to the parent element.

Reconstruction data at a higher level of quality can override settings of the parent element associated with the second symbol. Accordingly, when a parent element is assigned a second symbol, the signal processor can identify a class to which the element belongs as well as be informed that reconstruction data at one or more higher levels of quality may include setting information for the subdivisions that is potentially different than that of the parent.

As discussed herein, inheritance of settings up the levels of quality in the hierarchy can efficiently capture coarse setting information of the signal. Finer detailed setting information for the signal can be captured via so-called complementary residual data indicating how to adjust settings of the elements at the different levels of quality. A combination of the coarse setting information and the detailed setting information enables reconstruction of the original signal or a near replica of the original signal.

In one embodiment, the signal processor can receive a second set of reconstruction data to reconstruct the signal at a higher level of quality. The second set of reconstruction data can include a so-called inheritance symbol (e.g., an "inherit" marker) indicating that the given sub-element (to which the reconstruction data pertains) inherits the same attribute setting that was assigned to the parent element.

As mentioned, elements in a rendition of the signal at the first level of quality can be assigned appropriate settings information. The settings information can include use of symbols to indicate, for example, a class to which the respective element belongs as well as whether all of the sub-elements derived from the respective element will inherit that same setting information as the parent. In one embodiment, reconstruction data to reconstruct the signal at each of one or more higher levels of quality can indicate a probability distribution or entropy of the symbols.

In accordance with further embodiments, a first group of symbols can include multiple symbols indicating a range of adjustment values. A second group of symbols can include multiple symbols duplicating the range of adjustment values in the first group. The symbols in either group can be assigned to an element to make an adjustment with respect to a current setting of the element. However, assignment of a symbol in the first group can indicate an adjustment as well as indicate that any subdivisions of a parent element into sub-elements are also assigned the same symbol as the parent element. Accordingly, in this instance, when sub-elements inherit the same adjustment value as a parent element, there is no need to continue to encode reconstruction data at higher levels of quality to include setting information for each sub-element of the parent element. It is known in advance that the sub-elements derived from the parent element inherit the same value assigned to the parent element.

Note that assignment of a symbol in the second group indicates an adjustment and that any subdivisions of a parent element into sub-elements are not necessarily assigned the same symbol as the parent element and that the reconstruction data at one or more higher levels of quality may indicate a different setting than the parent element. In other words, when assigned a symbol in the second group, the reconstruction data at higher levels for the sub-elements needs to be checked to determine the settings for the respective sub-elements.

Accordingly, a symbol assigned to a parent element can be selected from multiple symbols, each symbol in a first set of the multiple symbols can indicate a different respective adjustment value in a range of adjustment values, each symbol in a second set of adjustment values can be configured to indicate different respective adjustment values in the range. Assignment of a respective symbol in the first set of symbols indicates that each of the multiple sub-elements and all further divisions of the multiple sub-elements derived from the parent element into smaller sub-elements at higher levels of quality are assigned the same value as the respective symbol and that strings of reconstruction data to reconstruct the signal at levels of quality higher than the first level of quality do not include a transmission of a duplication of the respective symbol. Assignment of a respective symbol in the second set of symbols indicates that each of the multiple sub-elements and all further divisions of the multiple sub-elements derived from the parent element into smaller sub-elements at higher levels of quality may be assigned different symbols as specified by symbols in strings of reconstruction data indicating how to reconstruct the signal at levels of quality higher than the first level of quality.

These and other embodiment variations are discussed in more detail below.

As mentioned above, note that embodiments herein can include a configuration of one or more computerized devices, routers, network, workstations, handheld or laptop computers, or the like to carry out and/or support any or all of the method operations disclosed herein. In other words, one or more computerized devices or processors can be programmed and/or configured to operate as explained herein to carry out different embodiments.

In addition to the signal processing as discussed above, yet other embodiments herein include software programs to perform the steps and operations summarized above and disclosed in detail below. One such embodiment comprises a computer-readable, hardware storage resource (i.e., a non-transitory computer readable media) including computer program logic, instructions, etc., encoded thereon that, when performed in a computerized device having a processor and corresponding memory, programs and/or causes the processor to perform any of the operations disclosed herein. Such arrangements can be provided as software, code, and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes a computer-readable hardware storage medium having instructions stored thereon for supporting signal processing operations. For example, in one embodiment, the instructions, when carried out by a processor of a respective computer device, cause the processor to: receiving a first set of reconstruction data to reconstruct the signal at a first level of quality, the first set of reconstruction data including a symbol specifying an attribute setting of a parent element in the rendition of the signal at the first level of quality; dividing the parent element into multiple sub-elements to reconstruct the signal at a second level of quality, the second level of quality higher than the first level of quality; and utilizing the attribute setting of the parent element as specified by the symbol as a default attribute setting for a respective sub-element in the multiple sub-elements unless a second set of reconstruction data to reconstruct the signal at the second level of quality specifies a different attribute setting for the respective sub-element.

The ordering of the steps has been added for clarity sake. These steps can be performed in any suitable order.

Other embodiments of the present disclosure include software programs, firmware, and/or respective hardware to perform any of the method embodiment steps and operations summarized above and disclosed in detail below.

Also, it is to be understood that the system, method, apparatus, instructions on computer readable storage media, etc., as discussed herein can be embodied strictly as a software program, as a hybrid of software, firmware, and/or hardware, or as hardware alone such as within a processor, or within an operating system or within a software application, etc.

As discussed above, techniques herein are well suited for use in software, firmware, and/or hardware applications that process signals. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended that each of the concepts can be executed independently of each other or in combination with each other. Accordingly, the one or more present inventions, embodiments, etc., as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIGS. 5 through 10 are example diagrams illustrating inheritance of settings up different levels of quality according to embodiments herein.

FIG. 14 is an example diagram illustrating inheritance from other planes according to embodiments herein.

DETAILED DESCRIPTION

In accordance with one embodiment, a first set of reconstruction data includes a symbol specifying an attribute setting of a parent element in a rendition of the signal at a first level of quality (e.g., attribute settings can include color components in a suitable color space, coordinates of motion vectors, temperature values, radioactivity values, density values, etc.). The attribute setting can be one of multiple attribute settings of the parent element indicating how to configure the parent element for the rendition of the signal at a first level of quality. A signal processor divides the parent element into multiple sub-elements to reconstruct the signal at a second, higher level of quality. The signal processor utilizes the attribute setting of the parent element as specified by the symbol (at the first level of quality) as a default attribute setting for one or more respective sub-elements (into which the parent element is divided) until reconstruction data to reconstruct the signal at a higher level of quality specifies a different setting for the respective sub-elements. Thus, a sub-element can inherit settings of the parent element.

In one embodiment, the symbol assigned to the parent element can indicate that the setting for each sub-element derived from the parent element will always inherit the setting of the parent element. Another symbol assigned to the parent element can indicate that the sub-elements derived from the parent element may change at higher levels of quality in accordance with settings as specified by the reconstruction data for the higher levels of quality.

Figure 1:
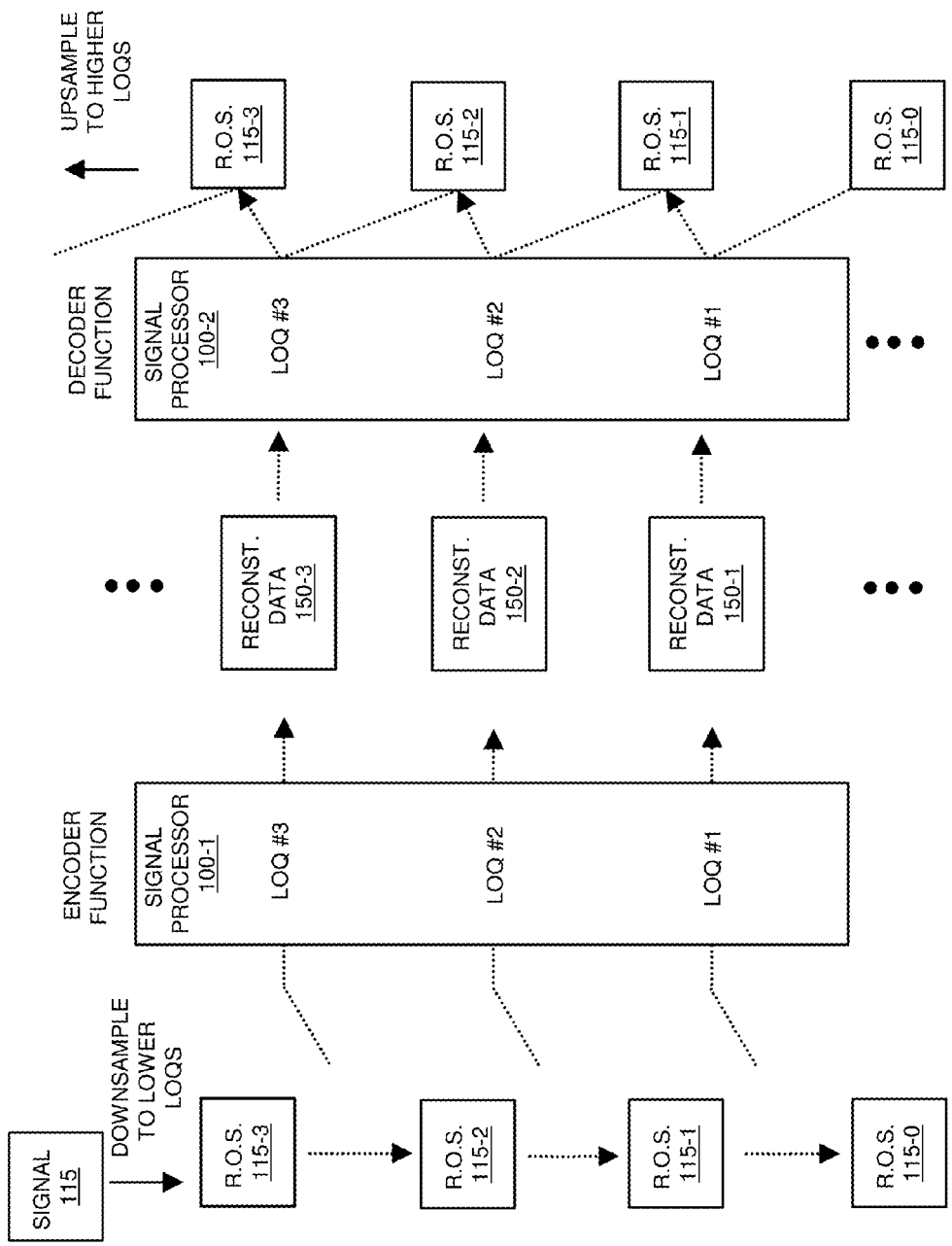
FIG. 1 is an example diagram illustrating generation and use of reconstruction data according to embodiments herein.

FIG. 1 is an example diagram illustrating generation of reconstruction data according to embodiments herein.

As shown, a signal processor 100-1 downsamples a signal 115 into different renditions at lower levels of quality in a hierarchy. In general, downsampling the signal 115 can include producing a rendition of the signal at each of different levels of quality and generating reconstruction data specifying how to convert a given rendition of the signal at a first level of quality into a rendition of the signal at a next higher level of quality in the hierarchy.

Signal processor 100-2 utilizes the reconstruction data 150 to reconstruct renditions of the signal at different levels of quality. The signal processor 100-2 can receive the reconstruction data 150 from any suitable source (e.g., communication link, storage device, etc.).

Note that values associated with the rendition of signal 115 and corresponding rendition of the signal at lower levels of quality can represent any suitable type of data information. By way of non-limiting example, the signal 115 can be two dimensional (e.g., pictures, video frames, 2D motion maps, thermal maps, etc.), three-dimensional (e.g., 3D/volumetric images, holographic images, CAT-scans, medical/scientific images, 3D motion maps, etc.), or even feature more than three dimensions, indicating settings of each of multiple signal elements (e.g., pels/plane elements for a generic multidimensional signal, pixels/picture elements for a 2D signal, voxels/volumetric picture elements for a 3D signal, etc.) in a respective image.

In one embodiment, each element in the signal 115 can be attributed several settings such as one or more color components (in accordance with such an embodiment, color components of an element in the signal data are encoded in accordance with a suitable color space standard, such as YUV, RGB, HSV, etc.), intensity of a given metric (e.g., temperature, radioactivity, density, etc.), motion vector coordinates, motion zone membership, class membership (e.g., bone, soft tissue, metal, blood, etc.), etc. Reconstruction data 150 specifies how to generate one or more settings for each element in the renditions of signal 115. The reconstruction data 150 can be configured to specify multiple planes of attribute settings.

The settings of the signal elements or components indicate how to represent/display the signal for playback on a device. Reconstruction data 150 can include multiple planes of reconstruction data 150. Many parameters may be needed to define settings for a given element of signal 115.

In accordance with further embodiments, signal 115 can represent an original signal or high-resolution signal including multiple elements. In such an embodiment, each of the renditions of the signal (e.g., rendition of signal 115-3, rendition of signal 115-2, rendition of signal 115-1, . . . ) can be akin to a thumbnail representation of an original signal that has been downsampled from signal 115 to a lower level of quality. Renditions of signal 115 at the higher level of quality include more detailed playback information.

In one embodiment, the renditions of signal 115 at the lower levels of quality capture coarser attributes of the original signal, but not the more detailed finer attributes of the original signal. The detailed, finer attributes appear in the rendition of signal at higher levels of quality.

By way of further non-limiting example, in one embodiment, the signal processor 100-1 downsamples original signal 115 into rendition of signal 115-3; signal processor 100-1 downsamples rendition of signal 115-3 into rendition of signal 115-2; signal processor 100-1 downsamples rendition of signal 115-2 into rendition of signal 115-1; and so on to a lowest level of quality. The signal 115 can be downsampled into any number of suitable levels from a highest level of quality.

As mentioned, when downsampling the rendition of signal 115 to each lower level of quality, the signal processor 110-1 can generate respective reconstruction data 150. Reconstruction data at each level indicates how to upsample, convert, modify, etc., a rendition of signal at a lower level of quality into a rendition of signal at a next higher level of quality. For example, reconstruction data 150-1 indicates how to convert the rendition of signal 115-0 into the rendition of signal 115-1; reconstruction data 150-2 indicates how to convert the rendition of signal 115-1 into the rendition of signal 115-2; reconstruction data 150-3 indicates how to convert the rendition of signal 115-2 into the rendition of signal 115-3; and so on.

Reconstruction data 150 can include any of multiple different types of data indicating how to reconstruct the signal 115 at higher levels of quality. For example, reconstruction data include any of one or more sets, planes, etc., of different types of reconstruction data such as parameters of upsampling operations, quantization threshold information, residual data to apply after upsampling from lower levels of quality, residual data to apply after motion compensation of an available reference signal image, adjustments to motion vectors in a dense motion map used for motocompensation, motion zone membership, spectral information on noise, meta-data, adjustments, class information, etc., to reconstruct signal 115 at different levels.

Additional example details of downsampling a respective signal and producing reconstruction data is described in related application U.S. patent application entitled "SIGNAL PROCESSING AND TIERED SIGNAL ENCODING,", filed on the same day as the present application, the entire teachings of which are incorporated herein by this reference. In such an embodiment, the signal processor can be configured to test and create different sets of reconstruction data to convert a rendition of the signal from one level of quality to another.

As mentioned, reconstruction data 150 can include any suitable data for signal processing. For example, each set of reconstruction data 150 can include metadata, residual data, etc. Metadata can include data such as a set of one or more upsampling operations with which to convert the rendition of signal from one level of quality to the next; the residual data can indicate information such as adjustments to be made to signal elements at the different levels of quality, and so on. More specifically, the reconstruction data 150 can specify multi-plane setting information such as color components of elements, intensity, upsample operations, parameters of upsampling operations, quantization thresholds, residual data within an image/frame, motion zones, motion vectors, residual data indicating adjustments to apply after motion compensation of elements coming from a previous frame, spectral information on noise, other meta-data, etc.

Note again that the sets of reconstruction data can include residual data indicating adjustments to be made after upsampling the rendition of signal at a first level of quality into the rendition of signal at a next higher level of quality. Additional details of a decoder system (i.e., signal processor) and use of residual data and upsample operations to upsample for use herein are described in related application U.S. patent application entitled "TIERED SIGNAL DECODING AND SIGNAL RECONSTRUCTION,", filed on the same day as the present application, the entire teachings of which are incorporated herein by this reference.

Embodiments herein include utilizing inheritance to reduce an amount of bits, symbols, etc. that are needed to encode reconstruction data 150. For example, the elements in the renditions of the signal at the lower levels of quality are assigned certain setting information. In certain cases, the setting information assigned to a respective element at a lower level of quality can be reused for subdivisions of the respective element at higher levels of quality. In other words, a parent element at one level of quality can be divided into multiple sub-elements for the next level of quality. Each sub-element (and corresponding sub-elements into which the sub-element is divided at higher levels of quality) can inherit one or more of the attribute settings of the parent element.

In this instance, rather than encoding reconstruction data at higher levels of quality to duplicate the settings of the parent for each sub-element, embodiments herein include using appropriate symbols to notify signal processor 100-2 (e.g., a decoder) of which sub-elements inherit attribute settings of the parent element.

In one embodiment, the inheritance information in the reconstruction data captures coarse signal setting information at the different levels of quality. The residual data in the reconstruction data captures finer detailed element setting information. In one embodiment, a combination of the coarse setting information (e.g., inheritance information) and the detailed setting information (e.g., residual data) enables efficient reconstruction of the original signal or a near replica of the original signal.

In accordance with further embodiments, signal processor 100-2 receives reconstruction data 150 to reconstruct the signal 115 at the first level of quality in the hierarchy. The signal processor 100-2 can receive the reconstruction data 150 over a communication link.

The set of reconstruction data 150-1 can include a symbol specifying an attribute setting of a parent element in the rendition of the signal 115-1 at the first level of quality. The attributes setting for the parent element can be one of multiple attribute settings of the parent element. A combination of multiple attribute settings can indicate how to configure the parent element for the rendition of the signal at a first level of quality.

By way of a non-limiting example, in one embodiment, the signal processor 100-2 divides the parent element into multiple sub-elements to reconstruct the signal 115 at a second, higher level of quality. When doing so, the signal processor 100-2 utilizes the attribute setting of the parent element as specified by the symbol (at the first level of quality) as a default attribute setting for one or more respective sub-elements unless or until a second set of reconstruction data to reconstruct the signal at the higher level of quality specifies a different attribute setting for the respective sub-element derived from the parent element. Accordingly, embodiments herein include reuse of setting information when reconstructing a signal at one or more higher levels of quality. This reduces an amount of data needed to define the signal 115 at one or more higher levels of quality.

In accordance with further embodiments, note that the inheritance symbol assigned to the parent element in a rendition of signal 115-1 can be encoded in a way as to specify that each of its subdivisions (e.g., the multiple sub-elements and all further divisions of the multiple sub-elements into smaller sub-elements at higher levels of quality) are assigned a same attribute setting as indicated by the symbol assigned to the parent element at the first level of quality all the way to the highest level of quality. Thus, attribute setting information need not be repeated in reconstruction data for the higher levels of quality.

Figure 2:
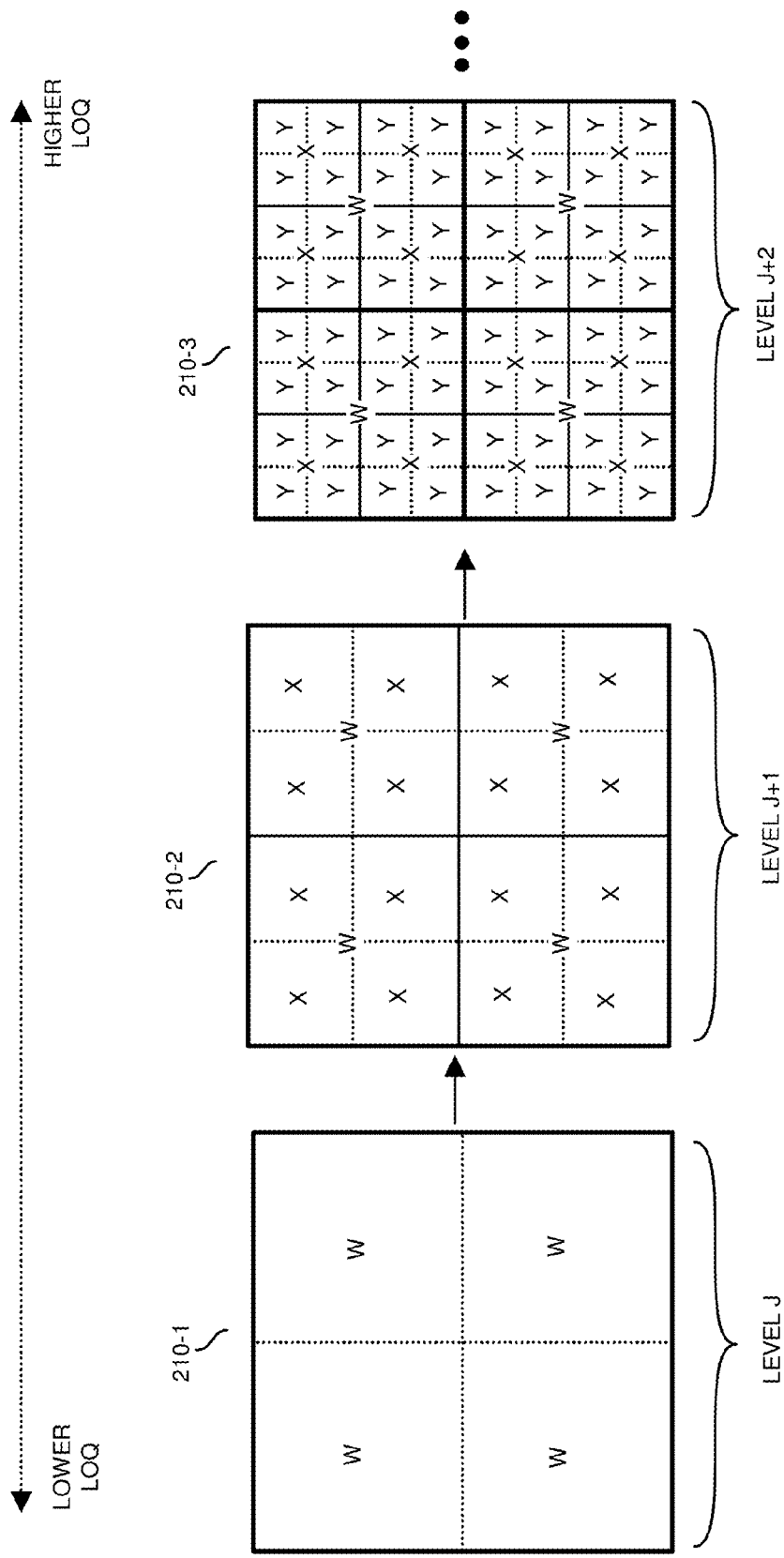
FIG. 2 is an example diagram illustrating dividing of parent elements into sub-elements according to embodiments herein.

FIG. 2 is an example diagram illustrating dividing a respective parent element into multiple sub-elements according to embodiments herein.

As previously discussed, in one embodiment, the signal 115 represents image information. Assume in this non-limiting example that the signal 115 and corresponding reconstruction data indicates how to convert or expand a lower resolution image into a higher resolution image.

Further, assume that the sets of encoded reconstruction data 150, when decoded, indicate how to control settings of image elements at each level of quality. For example, image 210-1 at level of quality J includes a field of image elements W; image 210-2 at level of quality J+1 includes field of image elements X; image 210-3 includes field of image elements Y; etc.

The reconstruction data for level of quality J indicates how to control settings of image elements W in image 210-1 (e.g., rendition of signal 115-0); the reconstruction data for level of quality J+1 indicates how to convert and generate setting information for each image element W in image 210-1 that is split into four X elements in image 210-2; the reconstruction data for level of quality J+2 indicates how to convert and generate setting information for each image element X in image 210-2 that is split into four Y elements in image 210-3; and so on.

Figure 3:
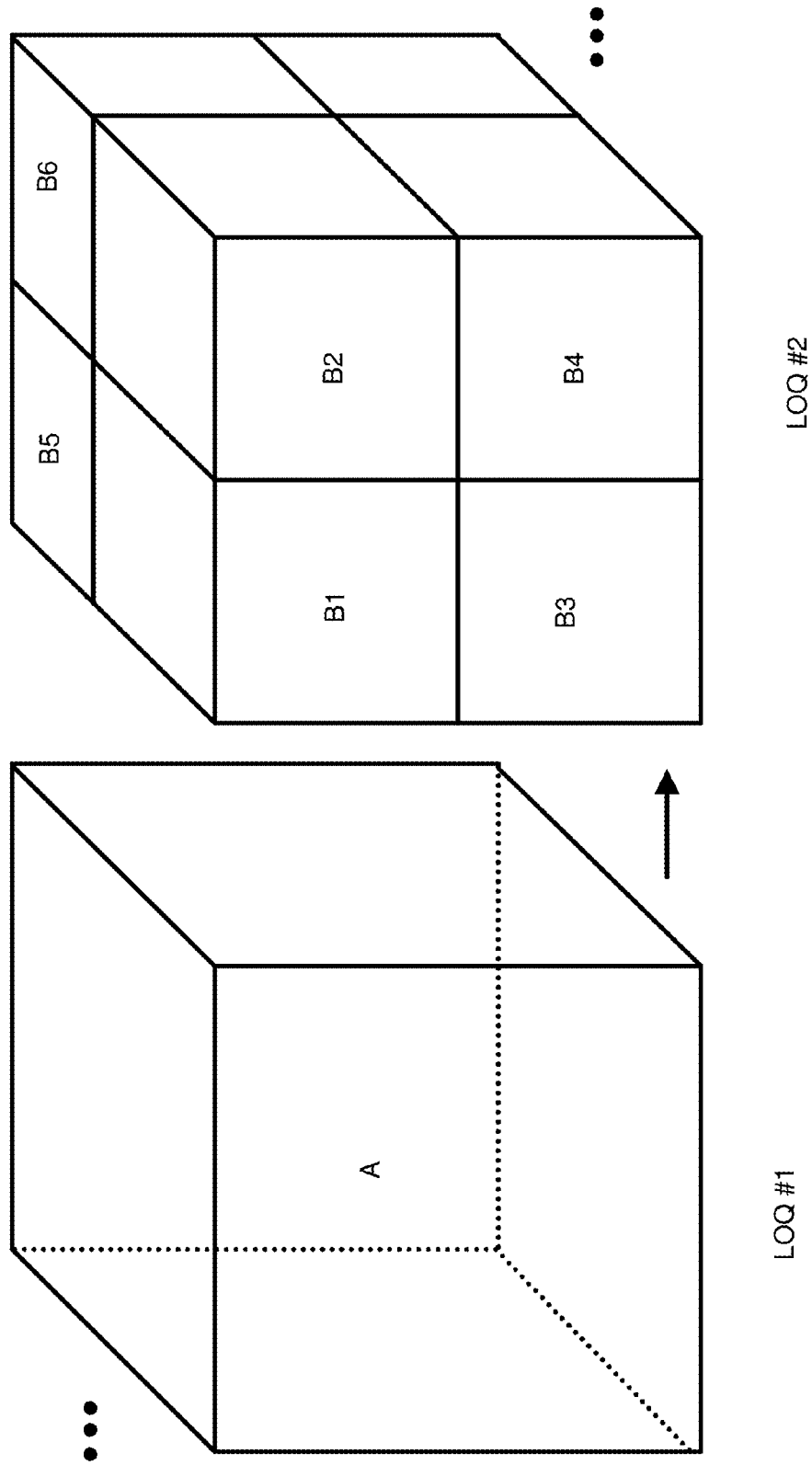
FIGS. 3 and 4 are diagrams illustrating reconstruction of a volumetric signal at different levels of quality via dividing of a parent element into sub-elements according to embodiments herein.
Figure 4:
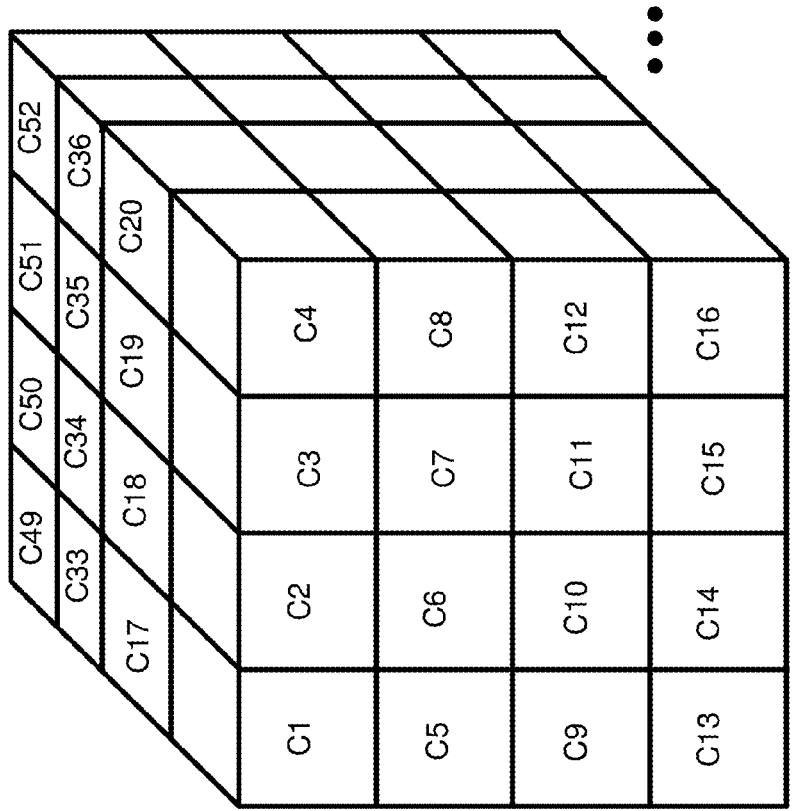
Figure 4:
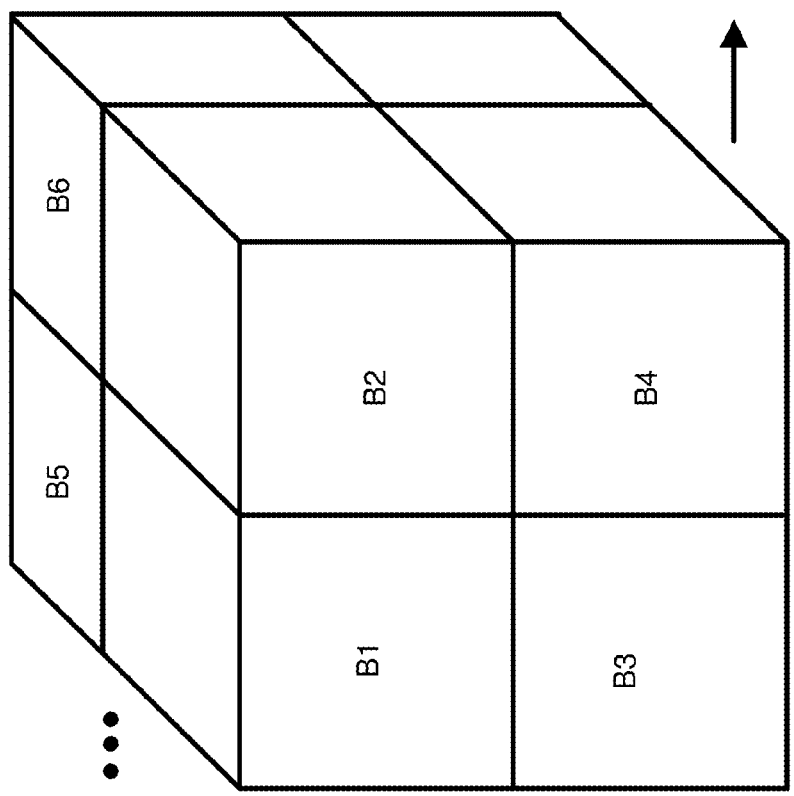

FIGS. 3 and 4 are example diagrams illustrating dividing of a respective element in a rendition of the signal at a lower level of quality into multiple sub-elements at a higher level of quality according to embodiments herein.

For example, in FIG. 3, the signal processor 100-2 uses appropriate reconstruction data 150 to identify settings for volumetric element A. The signal processor 100-2 then subdivides the volumetric element A into multiple volumetric sub-elements including B1, B2, . . . , B8 (e.g., B-elements) as shown to produce a rendition of the signal at a next higher level of quality. The reconstruction data for level of quality #2 includes information enabling the signal processor 100-2 to produce appropriate setting information for each of the B-type volumetric elements into which the A-type volumetric element is subdivided.

In FIG. 4, the signal processor 100-2 uses appropriate reconstruction data to produce settings for the type-C volumetric elements. For example, the signal processor 100-2 subdivides each type-B volumetric element into a corresponding set of multiple (e.g., eight in this example) type-C volumetric elements. The signal processor 100-2 subdivides all of the B-type elements results in C1, C2, . . . , C64 as shown to produce a rendition of the signal at a next higher level of quality. The reconstruction data for level of quality #3 includes information enabling the signal processor 100-2 to produce appropriate setting information for each of the type-C volumetric elements into which the type-B volumetric elements are subdivided.

In this way, the signal processor 100-2 can reconstruct the signal at higher levels of quality. Thus, in one embodiment, every signal element at a lower level of quality is converted into multiple elements at a higher level of quality. As mentioned, reconstruction data indicates settings or adjustments to settings of the parent element A and which sub-elements (e.g., type B, type C elements, etc.) inherit settings of the parent element A.

Figure 5:
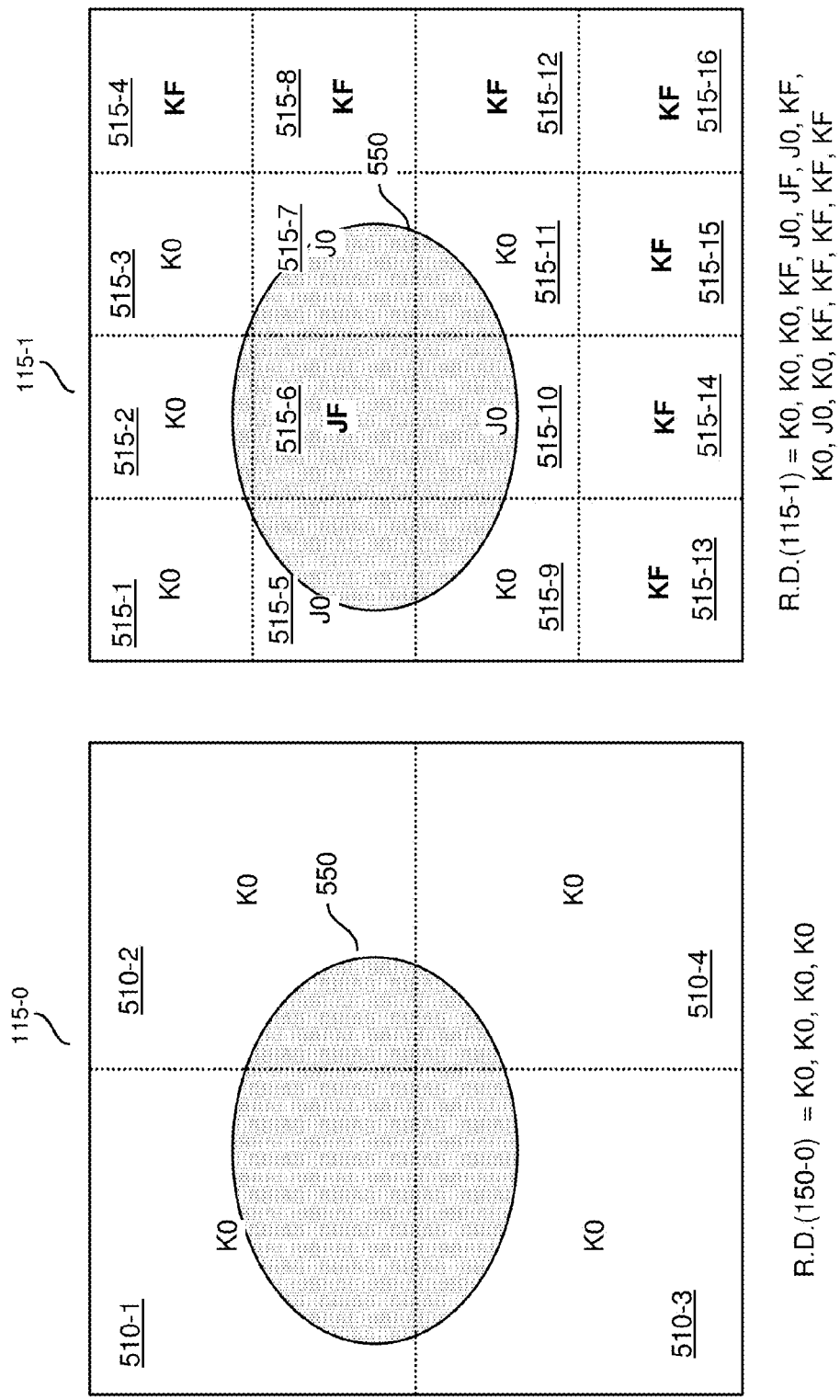
Figure 6:
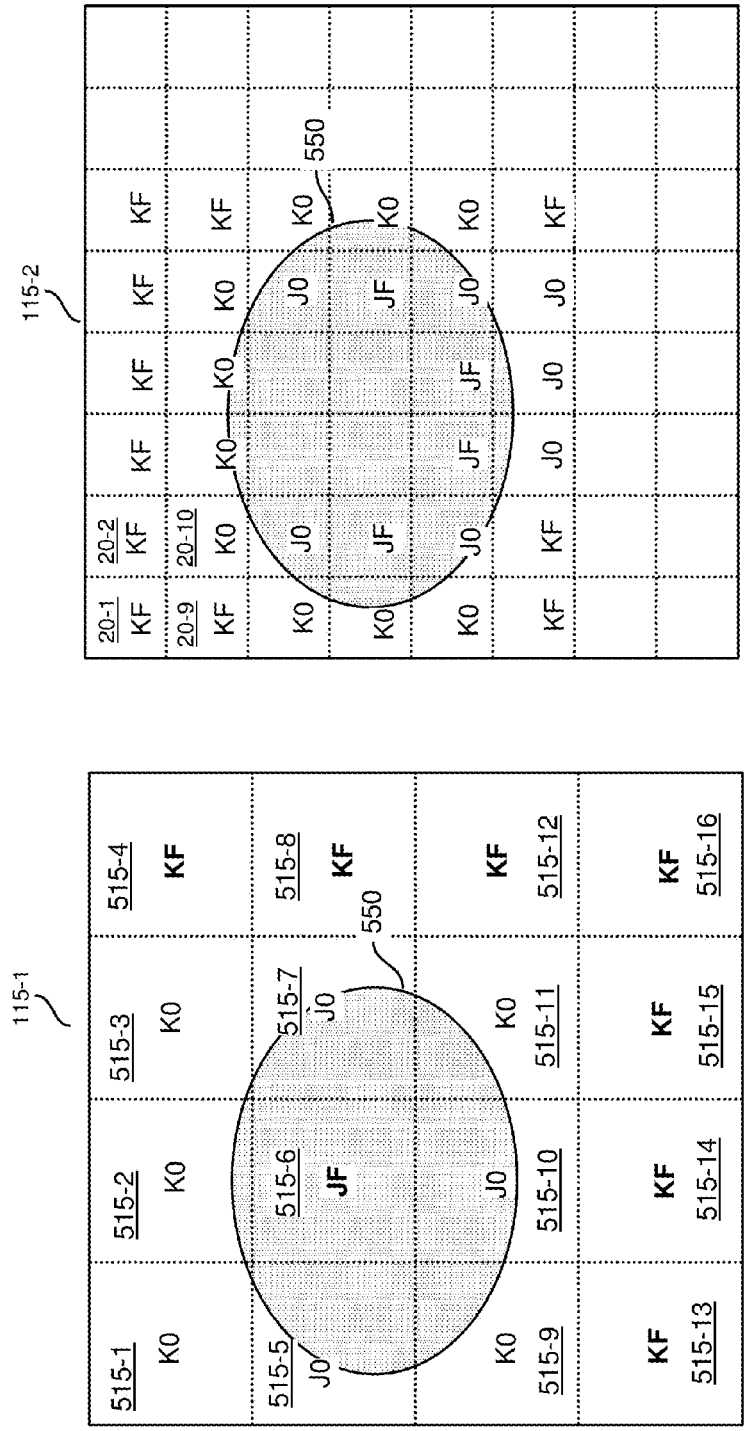

FIGS. 5 and 6 are example diagrams illustrating inheritance and non-inheritance of element settings up a hierarchy according to embodiments herein.

As shown in FIG. 5, rendition of signal 115-0 at level of quality #0 includes element 510-1, element 510-2, element 510-3, and element 510-4. Note that the number of elements is shown by way of non-limiting example only and that the rendition of signal 115-0 can include any suitable number of elements.

In one embodiment, each of the signal elements at a next higher level of quality occupies a portion of space completely included in a respective parent element. For example, each element in rendition of signal 115-0 is divided into multiple elements.

Element 510-1 is a so-called parent element and divided into element 515-1, element 515-2, element 515-5, element 515-6 in rendition of signal 115-1.

The other parent elements 510 are divided in a similar manner. For example, element 510-2 is a parent element divided into element 515-3, element 515-4, element 515-7, element 515-8 in rendition of signal 115-1.

Element 510-3 is a parent element divided into element 515-9, element 515-10, element 515-13, element 515-14.

Element 510-4 is a parent element divided into element 515-11, element 515-12, element 515-15, element 515-16.

In this example, assume that each of the elements fall into one of two classes—class J or class K. Class J indicates that the respective element belongs to region 550. Class K indicates that the respective element falls outside the region 550. Note that any number of suitable classes can be used to define attributes of the elements. Whether an element falls within class K or class J is merely one aspect defining attributes of a respective element.

In one embodiment, a first set of one or more symbols indicate that a respective element resides within class J. A second set of one or more symbols indicate that a respective element resides within class K.

Each symbol within a respective set of symbols for a given class can further define attributes of a respective element. For example, in one embodiment, assume that symbol J0 indicates that the element associated with the symbol is part of class J but that any sub-elements into which the element is sub-divided at higher levels of quality may or may not belong to class J. That is, one or more sub-elements derived from a respective element associated with the symbol J0 may be part of class K at a higher level of quality. Reconstruction data at a higher level can indicate which class each respective sub-element belongs.

In one embodiment, symbol K0 indicates that the element associated with the symbol is part of class K but that any sub-elements into which the element is sub-divided at higher levels of quality may or may not belong to class K. That is, one or more sub-elements derived from a respective element associated with the symbol K0 may be part of class J at a higher level of quality.

Thus, reconstruction data 150 can indicate that a parent element is part of a particular class and that sub-elements can be assigned to the same of different class than the parent element.

Another symbol in each set of symbols for a respective class can be reserved to indicate that the element and any sub-elements into which the respective element is divided will always inherit the same class as its parent element.

For example, the symbol JF can indicate that the respective element is assigned to class J as well as indicate that any sub-element (at any of one or more higher levels of quality) into which the element is divided at higher levels of quality will also belong to class J and that the value will not change. When assigned a value of JF, because it is known in which class each of the sub-elements will reside, it is no longer necessary to encode the reconstruction data for high levels of quality to indicate in which class each respective element resides as it is known that all the sub-elements are assigned to class J.

The symbol KF can indicate that the respective element is assigned to class K as well as indicate that any sub-element (at any of one or more higher levels of quality) into which the element is divided at higher levels of quality will also belong to class K and that the value will not change. When assigned a value of KF, because it is known in which class each of the sub-elements will reside, it is no longer necessary to encode the reconstruction data for high levels of quality to indicate in which class each respective element resides as it is known that the sub-elements are assigned to class K.

Thus, the set of class J symbols can include symbol J0 and symbol JF. Symbol JF indicates that all sub-elements inherit the class quality J from a respective parent element.

The set of class K symbols can include symbol K0 and symbol KF. Symbol KF indicates that all sub-elements inherit the class quality K from a respective parent element.

Accordingly, a respective parent element can be called a "controlling" signal element to the extent that a setting of the parent element controls settings of one or more sub-elements at a higher level of quality. In other words, a respective symbol can specify that each of the multiple sub-elements and all further divisions of the multiple sub-elements into smaller sub-elements at higher levels of quality have been assigned a same attribute setting as indicated by the symbol assigned to the parent element at the first level of quality.

Referring again to FIG. 5, assume that each element in the renditions of signal 115 defines whether the respective element falls within the region 550. The region 550 can be a specific portion of an image.

As shown, the larger part of element 510-1 resides outside the boundary of region 550. The area within region 550 belongs to class J while the area outside region 550 belongs to class K.

As shown, initially, in rendition of signal 115-0, each of the parent elements 510 falls for the larger part outside region 550, and all are thus assigned a symbol of K0 since it is known that at least some sub-elements of any of these elements may change to class J at a higher level of quality.

Reconstruction data used to produce rendition of signal 115-0 includes the string of symbols K0, K0, K0, and K0 to indicate that sub-elements into which the elements 510 may be divided may be assigned to class J or class K at a higher level of quality. Note again that the setting information for a sub-element derived from a parent element associated with symbol K0 can be the same or different from its parent element.

Reconstruction data 150-1 can include information indicating attributes of each element 515 in rendition of signal 115-1. The settings for sub-elements may be the same or different from the settings of the parent element. In this example, some of the elements 515 inherit the setting of respective parent elements 510.

Certain settings of elements 515 in rendition of signal 115-1 indicate inheritance of signal information at a next higher level of quality. For example, based on a given element setting, it is possible that the decoder receives indication that its inherited value will not/cannot be modified any longer for the higher levels of the hierarchy. That is, a setting will be inherited by all the controlled signal elements in higher levels. Leveraging the respective inheritance operation defined for a chain of settings (e.g., in the non-limiting example described above, "carbon copy" of the value of the parent element), the decoder will be able to determine settings for each controlled signal elements (i.e., sub-elements derived from the parent element) up to the highest level of quality, without the need to send any additional information/adjustment.

More specifically, it is known that element 515-6 in rendition of signal 115-1 and any sub-elements into which it can be divided at one or more higher levels of quality will always fall within class J because the entire element 515-6 resides within region 550. Thus, element 551-6 is assigned symbol JF.

Additionally, it is known that each of elements 515-4, 515-8, 515-12, 515-13, 515-14, 515-15, and 515-16 in rendition of signal 115-1 and any sub-elements into which each of these elements can be divided at one or more higher levels of quality will always fall within class K because the entire portion of each respective parent element resides outside of region 550. Thus, reconstruction data 150-1 indicates that each of elements 515-4, 515-8, 515-12, 515-13, 515-14, 515-15, and 515-16 is assigned symbol KF.

For any element assigned a value of JF or KF, the respective reconstruction data at higher levels of quality need not include redundant information to describe a setting of their respective controlled sub-elements.

Note that each of elements 515-1, 515-2, 515-3, 515-5, 515-7, 515-9, 515-10, 515-11 reside on a boundary of region 550. In one embodiment, each of these respective elements is assigned a class value depending on whether the larger part of the respective element falls inside region 550 or not. Thus, each of elements 515-5, 515-7, and 515-10 are assigned symbol J0; each of elements 515-1, 515-2, 515-3, 515-9, and 515-11 are assigned symbol K0.

Referring now to FIG. 6, each of the elements 515 in rendition of signal 115-1 is divided into multiple sub-elements (e.g., four sub-elements) to create rendition of signal 115-2. As mentioned, the settings for each sub-element can be inherited from the parent element or can be assigned a different value as indicated by the respective reconstruction data for the level of quality.

As an example, element 515-1 is divided into sub-elements 20-1, 20-2, 20-9, and 20-10. Each of the other elements 515 is subdivided in similar manner as shown to produce sub-elements in rendition of signal 115-2.

Sub-elements in rendition of signal 115-2 as derived from element 515-4 inherit symbol settings of the parent element 515-4 because the element 515-4 is assigned a value of KF. For example, these sub-elements derived from element 515-4 are known to belong to class K because of assignment of the symbol KF to element 515-4. The reconstruction data for rendition of signal 115-2 does not include setting information (e.g., the element is left blank, no information bits are wasted) because the sub-elements derived from element 515-4 inherit the settings of the parent element 515-4. In a similar manner, there is no class setting information in reconstruction data 150-2 for sub-elements derived from elements 515-6, 515-8, 515-12, 515-13, 515-14, 515-15 and 515-16 since the class setting information for each derived sub-element is inherited from the respective class of the parent element.

Reconstruction data 150-2 includes class setting information for sub-elements 20-1, 20-2, 20-9, and 20-10 derived from element 515-1. For example, each of elements 20-1, 20-2, and 20-9 is assigned a symbol KF to indicate that these elements and any sub-elements derived from these elements at higher levels of quality are to be assigned a value of class K. Because element 20-10 includes a portion of region 550 but is predominantly outside of region 550, the element 20-10 is assigned a symbol K0.

In a similar manner, each of the other elements 515 is subdivided and assigned symbols as shown. Inheritance (or non-inheritance) of settings from one level in the hierarchy to the next one or more higher levels can help to define coarse versus fine attributes of the signal through the levels of quality.

In one embodiment, an entropy encoder (with different appropriate settings that indicate the probability distribution of the different symbols) is used in order to encode and transmit the string of different symbols to a decoder. The distribution of probabilities (also subject to inheritance from lower levels) can be modified/updated for specific levels of quality by transmitting appropriate information. In other words, reconstruction data to reconstruct the signal at each of multiple higher levels of quality can indicate a probability distribution of the multiple symbols (e.g., as selected from a first set of symbols, a second set of symbols, etc.) in each set of reconstruction data 150.

Figure 7:
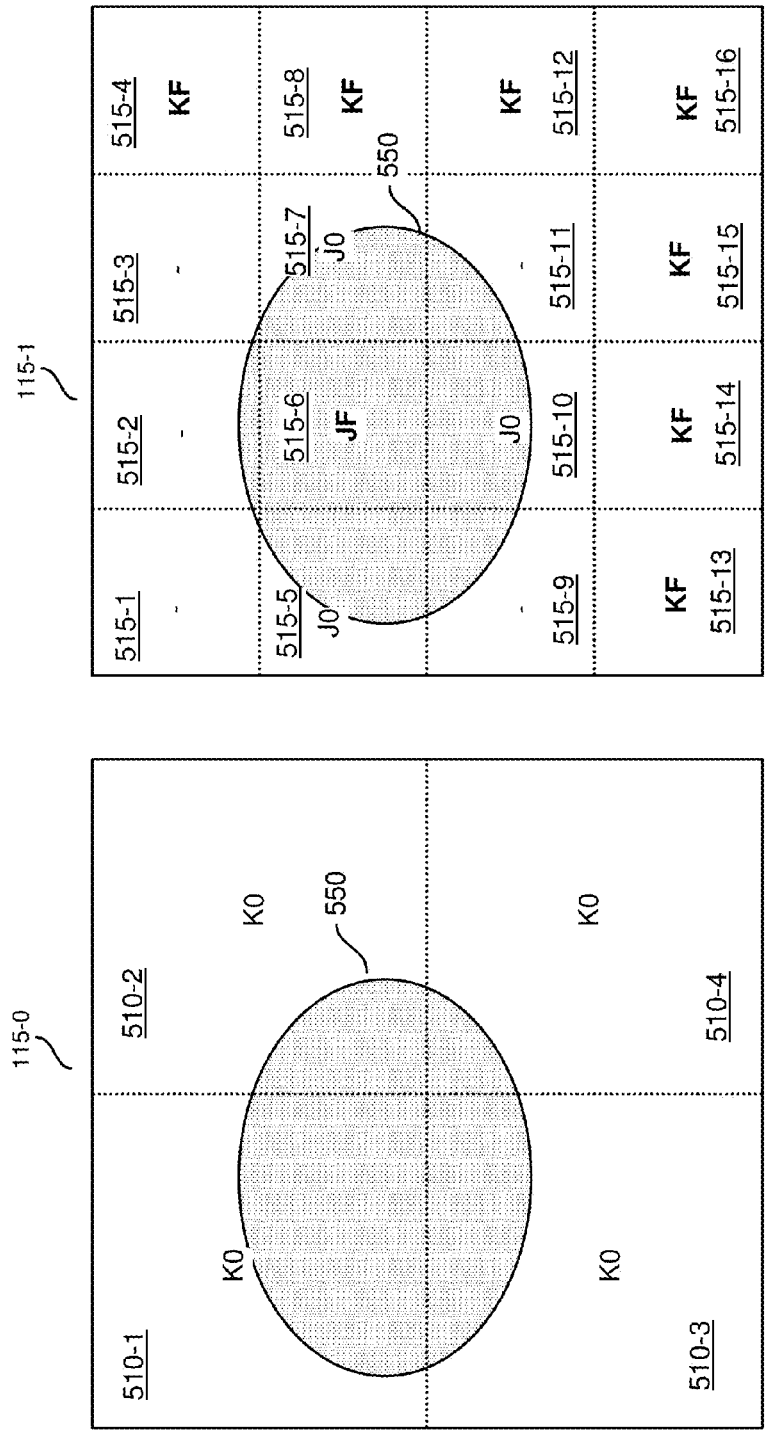

FIGS. 7 and 8 illustrate inheritance of settings according to different embodiments herein. In accordance with this example embodiment, a "-" symbol indicates that a respective element (e.g., parent element, sub-element, etc.) inherits the same setting as its corresponding parent element for a given parameter.

For example, element 510-1 is subdivided into sub-elements 515-1, 515-2, 515-5, and 515-6 in a similar manner as previously discussed. Instead of assigning a value of K0 to each of element 515-1 and 515-2 as in the last example, an encoder assigns the value "-" or no symbol to each of these elements to produce the string of reconstruction data as shown. As mentioned, the "-" or no symbol in the string of reconstruction data indicates to the decoder that the respective sub-element inherits the same setting as its parent element or the last known setting in the lineage back to the parent element. That is, each of elements 515-1 and 515-2 inherits the symbol K0 from the parent element 510-1. As shown, and as previously discussed, certain sub-elements (e.g., sub-element 515-5 and 515-6) are assigned a different class from the respective parent element. FIG. 8 further illustrates use of the inheritance marker in lieu of using the same symbol as the parent.

FIG. 9 is an example diagram illustrating another example of reconstruction data and dividing a parent element into multiple sub-elements according to further embodiments herein.

In accordance such an embodiment, instead of indicating a class type in the above example, the settings assigned to a respective element can indicate an adjustment value selected from a range of possible values such as a value between −255 and +255, step=1. Each adjustment value in the range can be assigned a corresponding symbol to represent the adjustment value. Each symbol therefore represents a different adjustment value.

Embodiments herein can include assigning a symbol for each of the adjustment values −255, −254, −253, . . . −1, 0, 1, 2, 3, . . . 255. Assignment of an adjustment value in this range indicates that the adjustment value for respective sub-elements may be the same or different from a respective parent element associated with one of these symbols.

In other words, the symbol indicates an adjustment value and any sub-elements derived from the parent element do not necessarily inherit the same setting as the parent element.

One embodiment herein includes generating a duplicate or second set of adjustment values for the given range. For example, each adjustment value in the second set can be assigned a respective unique symbol. Similar to the symbols as discussed above, each symbol in the second set indicates a magnitude of the adjustment value as well as polarity. However, symbols in the second set also indicate that all respective sub-elements derived at one or more higher levels of quality from the parent element inherit the same adjustment setting (or final value) as the parent. More specifically, each of elements 910 in rendition of signal 115-0 have been assigned a respective adjustment as indicated by reconstruction data 150-0 (e.g., a string of symbols). Any adjustment value that has an "F" following the integer value indicates that all sub-elements derived from the respective parent element have been assigned the same adjustment as their respective parent element. In such cases, the reconstruction data at higher levels of quality does not include redundant information indicating the setting.

Alternatively, when assigned an adjustment value from the first set of symbols, the reconstruction data at higher levels of quality can indicate specific settings for the sub-elements derived from a respective parent element, without a definitive inheritance by all sub-elements derived from the respective parent element. As mentioned above, note that embodiments herein can include use of particular symbol such as a "-" symbol to indicate that a respective sub-element inherits the same value as the parent element in a similar manner as discussed above.

In this example, parent element 910-1 has been assigned an adjustment value of 10; parent element 910-2 has been assigned an adjustment value of 8F; parent element 910-3 has been assigned an adjustment value of 0F; parent element 910-4 has been assigned an adjustment value of 0.

Because the element 910-2 includes an adjustment value 8F from the second set of symbols, each of sub-elements 915-3, 915-4, 915-7, and 915-8 (and sub-elements and further subdivisions within element 910-2 at higher levels of quality) inherit the adjustment value 8. As shown, reconstruction data at higher levels of quality do not need to include information (e.g., symbols) for the settings of sub-elements 915-3, 915-4, 915-7, and 915-8 into which the parent element is derived because it is known to the decoder that the sub-elements inherit the same value as the parent. In a similar manner, each of elements 915-9, 915-10, 915-13, and 915-14 inherit the same adjustment value (i.e., 0) as their respective parent element 910-3 because the parent element has been assigned a value of 0F.

Conversely, parent element 910-1 is assigned an adjustment value of 10; parent element 910-4 is assigned an adjustment value of 0. Each of the sub-elements derived from these parent elements can be assigned a same or different adjustment value than a symbol assigned to the parent.

In this example, sub-element 915-1 is assigned an adjustment value 0F since it is known that every sub-element derived from or contained within the element 915-1 will be assigned a value of 0. Each of elements 915-2, 915-5, and 915-6 are symbols selected from the first set to indicate that the values for respective sub-elements at higher levels of quality may be different than a setting of the sub-element (which becomes a parent element to other sub-elements at a higher level of quality).

Thus, in accordance with further embodiments, a first group of symbols can include multiple symbols indicating a range of adjustment values. A second group of symbols can include multiple symbols duplicating the range of adjustment values in the first group. The symbols in either group can be assigned to an element to indicate an adjustment with respect to a current setting of the element. However, assignment of a symbol in the first group can indicate an adjustment as well as indicate that any subdivisions of a parent element into sub-elements inherit the same symbol as the parent element unless setting information in reconstruction data at a higher level of quality indicates differently.

Assignment of a symbol in the second group indicates an adjustment and that any subdivisions of a parent element into sub-elements are necessarily assigned the same symbol as the parent element, so that the reconstruction data at one or more higher levels of quality will never indicate a different setting than the parent element. Accordingly, in this instance, there is no need to encode reconstruction data to include setting information for each sub-element.

Thus, a symbol assigned to a parent element can be selected from multiple symbols, each symbol in a first set of the multiple symbols configured to indicate a different respective adjustment value in a range of adjustment values, each symbol in a second set of adjustment values configured to indicate different respective adjustment values in the range. As mentioned, assignment of a respective symbol in the first set of symbols can indicate that each of the multiple sub-elements and all further divisions of the multiple sub-elements derived from the parent element into smaller sub-elements at higher levels of quality may be assigned different symbols, as specified by symbols in strings of reconstruction data indicating how to reconstruct the signal at levels of quality higher than the first level of quality.

Assignment of a respective symbol in the second set of symbols indicates that each of the multiple sub-elements and all further divisions of the multiple sub-elements derived from the parent element into smaller sub-elements at higher levels of quality are assigned the same value as the respective symbol, and that strings of reconstruction data to reconstruct the signal at levels of quality higher than the first level of quality do not include a transmission or duplication of the respective symbol.

In addition to specifying an attribute such as class type, adjustment value, etc., a symbol indicating inheritance can indicate to the signal processor 100-2 which elements, sub-elements, etc., will no longer include respective reconstruction data for a given parameter. For example, in one embodiment, assignment of a symbol (indicating inheritance) indicates that reconstruction data to reconstruct the signal at higher levels of quality will not include information indicating a class type to which any sub-elements derived from the parent belong and that the sub-elements are assigned to a type as indicated by the symbol. The decoder keeps track of such locations when decoding a respective string of reconstruction data to identify settings for sub-elements that do not inherit the same value as the parent element.

As mentioned, use of inheritance symbols significantly reduces an amount of data needed to reconstruct a signal at one or more levels of quality.

Figure 11:
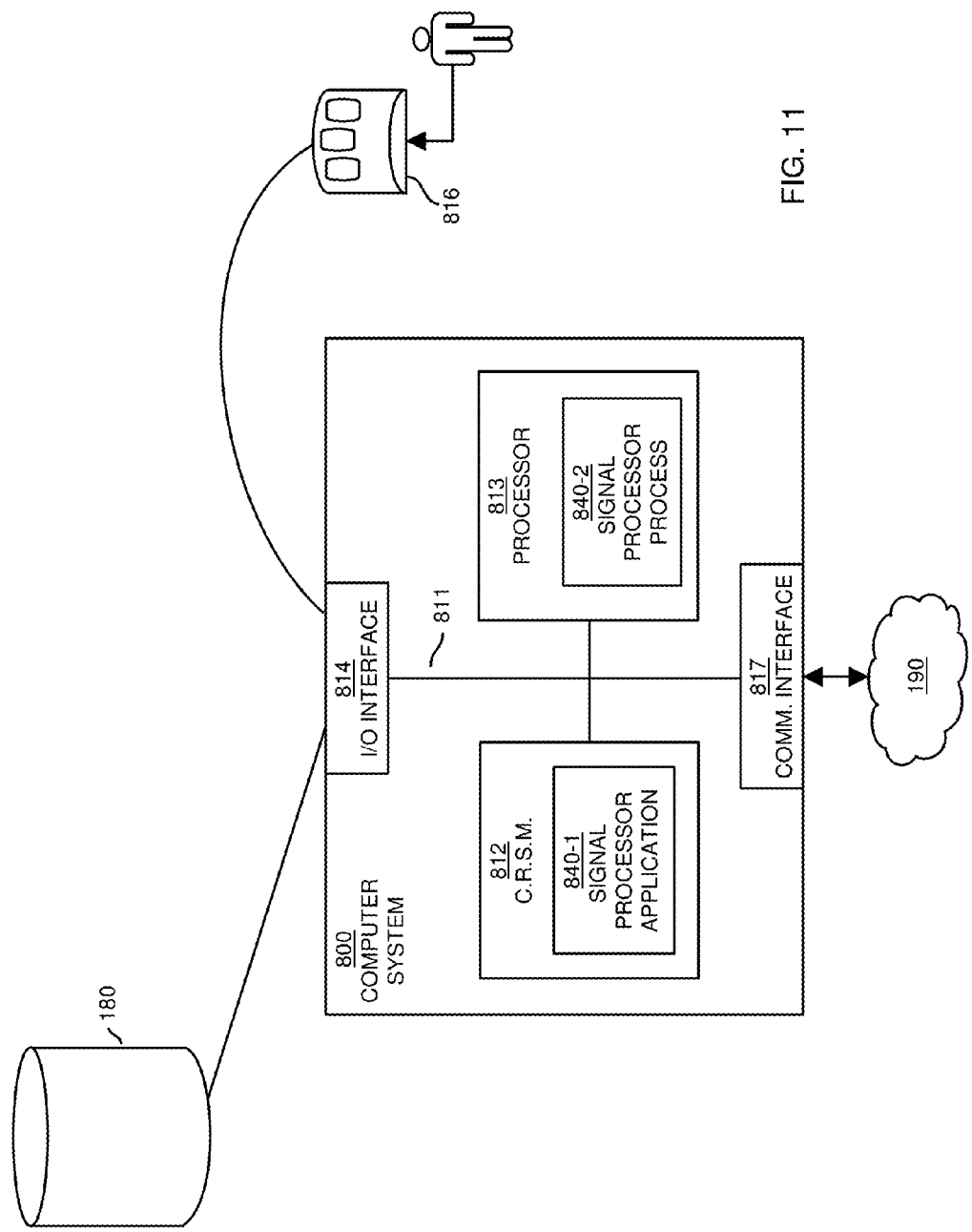
FIG. 11 is a diagram illustrating an example computer architecture for executing computer code, firmware, software, applications, logic, etc., according to embodiments herein.

FIG. 11 is an example block diagram of a computer system 800 that provides computer processing according to embodiments herein.

Computer system 800 can be or include a computerized device such as a personal computer, processing circuitry, television, playback device, encoding device, workstation, portable computing device, console, network terminal, processing device, network device, operating as a switch, router, server, client, etc.

Note that the following discussion provides a basic embodiment indicating how to carry out functionality associated with signal processor 100-1 and/or signal processor 100-2 as previously discussed. However, it should be noted that the actual configuration for carrying out the operations as described herein can vary depending on a respective application.

As shown, computer system 800 of the present example includes an interconnect 811 providing communication with computer readable storage media 812 such as a non-transitory type of media, computer readable, hardware storage medium, etc., in which digital information can be stored and retrieved.

Computer system 800 can further include a processor 813, I/O interface 814, and a communications interface 817.

In one embodiment, I/O interface 814 provides connectivity to repository 180, and if present, display screen, peripheral devices 816 such as a keyboard, a computer mouse, etc.

As briefly mentioned above, computer readable storage medium 812 (e.g., a computer readable hardware storage media) can be any suitable device and/or hardware such as memory, optical storage, hard drive, floppy disk, etc. In one embodiment, the computer readable storage medium is a non-transitory storage media (i.e., non-carrier wave media) configured to store instructions associated with signal processor application 840-1. The instructions are executed by a respective resource such as signal processor 840-1 to perform any of the operations as discussed herein.

Communications interface 817 enables computer system 800 to communicate over network 190 to retrieve information from remote sources and communicate with other computers, switches, clients, servers, etc. I/O interface 814 also enables processor 813 to retrieve or attempt retrieval of stored information from repository 180.

As shown, computer readable storage media 812 can be encoded with signal processor application 840-1 executed by processor 813 as process 840-2.

Note that the computer system 800 can be embodied to include a computer readable storage medium 812 (e.g., a hardware storage media, non-transitory storage media, etc.) for storing data and/or logic instructions.

Computer system 800 can include a processor 813 to execute such instructions and carry out operations as discussed herein. Accordingly, when executed, the code associated with signal processor application 840-1 can support processing functionality associated with signal processors 100 and/or other resources as discussed herein.

During operation of one embodiment, processor 813 accesses computer readable storage media 812 via the use of interconnect 811 in order to launch, run, execute, interpret or otherwise perform the instructions of signal processor application 840-1 stored in computer readable storage medium 812. Execution of the signal processor application 840-1 produces processing functionality in processor 813. In other words, the signal processor process 840-2 associated with processor 813 represents one or more aspects of executing signal processor application 840-1 within or upon the processor 813 in the computer system 800.

Those skilled in the art will understand that the computer system 800 can include other processes and/or software and hardware components, such as an operating system or other software that controls allocation and use of hardware processing resources to execute signal processor application 840-1.

In accordance with different embodiments, note that computer system may be any of various types of devices, including, but not limited to, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Figure 12:
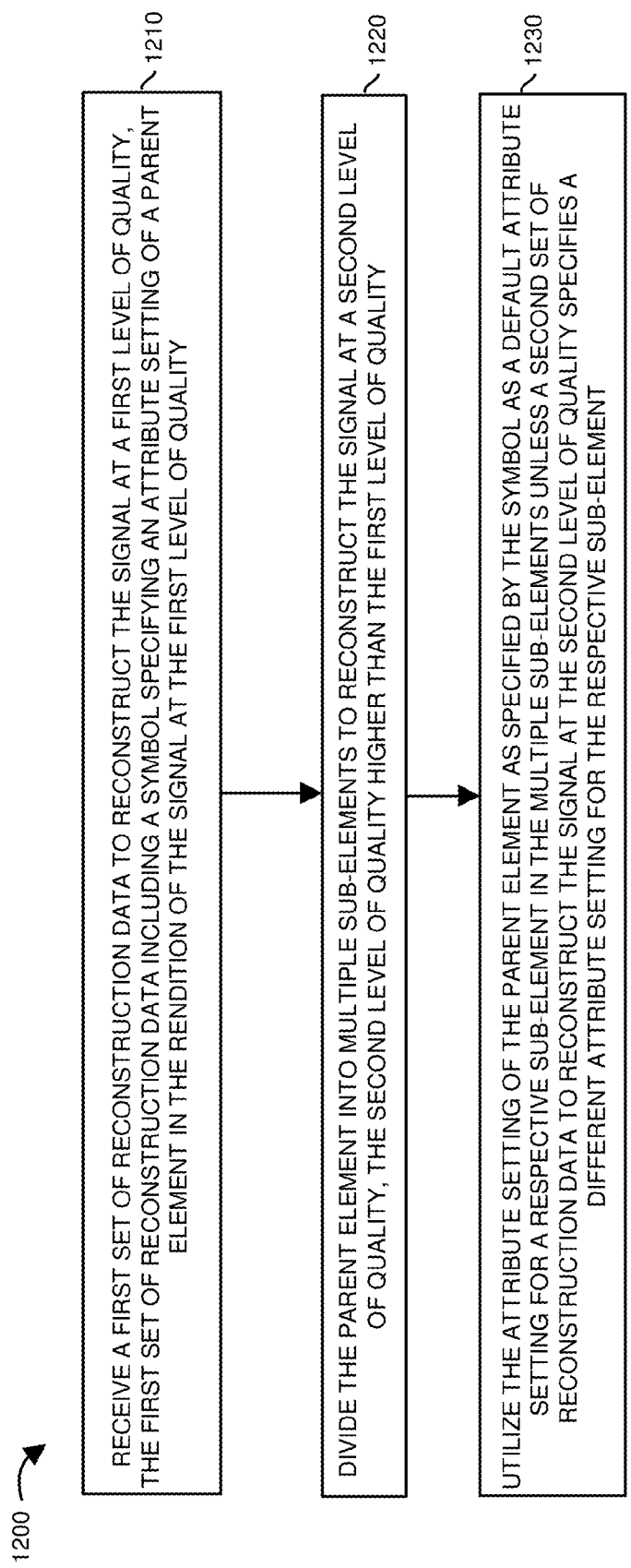
FIG. 12 is an example flowchart illustrating a method of generating and utilizing inheritance techniques according to embodiments herein.

FIG. 12 is an example flowchart 1200 illustrating a method of generating and utilizing a metric upsample according to embodiments herein.

In step 1210, the signal processor 100-2 receives a first set of reconstruction data to reconstruct the signal at a first level of quality. The first set of reconstruction data includes a symbol specifying an attribute setting of a parent element in the rendition of the signal at the first level of quality.

In step 1220, the signal processor 100-2 divides the parent element into multiple sub-elements to reconstruct the signal 115 at a second level of quality, the second level of quality higher than the first level of quality.

In step 1230, the signal processor 100-2 utilizes the attribute setting of the parent element as specified by the symbol as a default attribute setting for at least one respective sub-element of the multiple sub-elements (into which the parent element was subdivided) unless or until a second set of reconstruction data (e.g., reconstruct data at any higher level of quality) to reconstruct the signal at the second level of quality specifies a different attribute setting for the respective sub-element.

Figure 13:
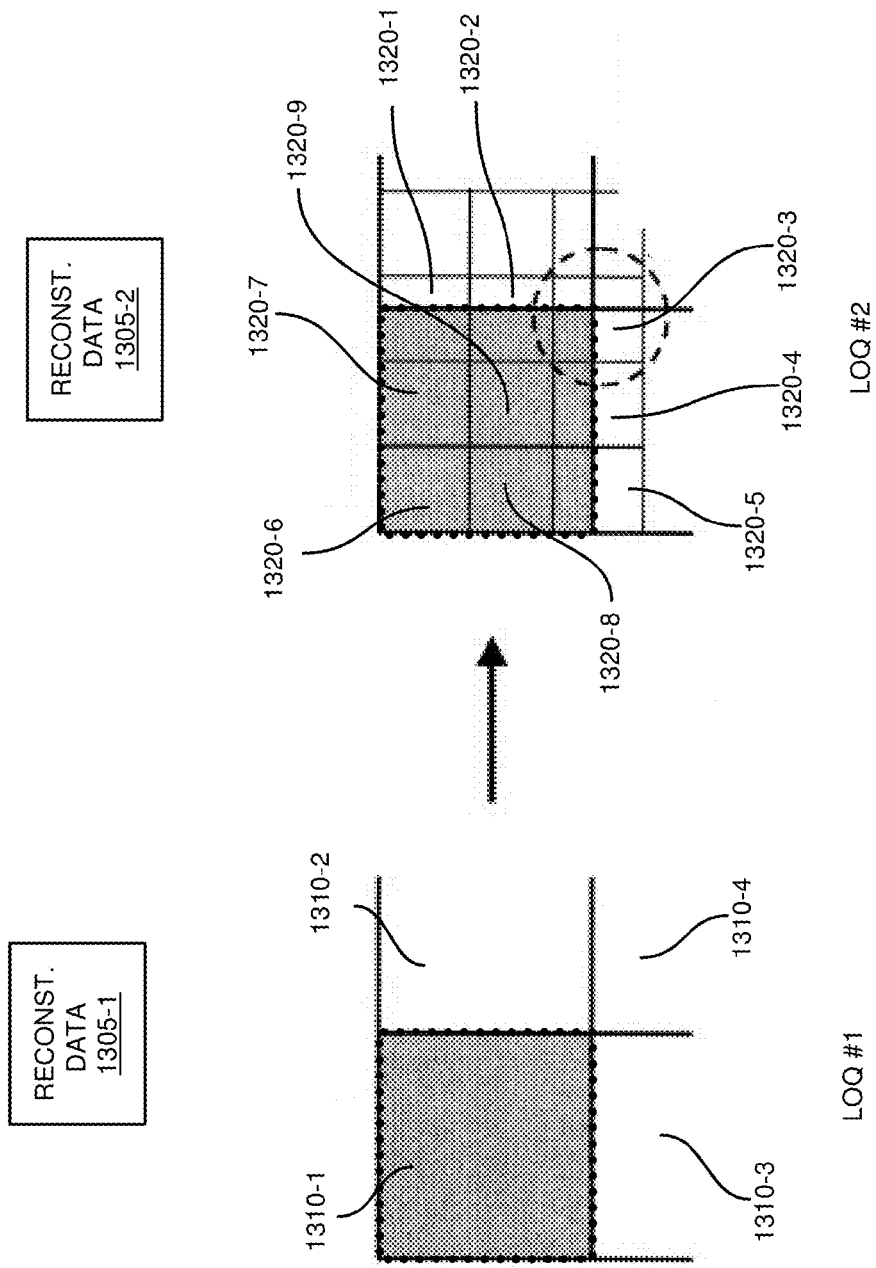
FIG. 13 is an example diagram illustrating upsampling according to embodiments herein.

FIG. 13 is an example diagram illustrating upsampling of an element into multiple elements using a non-integer scale factor according to embodiments herein.

As shown, elements 1310 are upsampled from one level of quality to the next level of quality. In this example, the elements 1310 are divided up into multiple sub-elements 1320. Four of the sub-elements 1320 are full sized and conditionally inherit properties of the parent element 1310-1 in a manner as discussed above. For example, sub-elements 1320-6, 1320-7,

1320-8, and 1320-9 can inherit setting information from the respective parent element 1310-1.

Note that element 1320-3 resides at an intersection of parent element 1310-1, parent element 1310-2, parent element 1310-3, and parent element 1310-4. Note that sub-elements 1320-1 and 1320-2 reside at an intersection of parent elements 1310-1 and 1310-2. Sub-elements 1320-4 and 1320-5 reside at an intersection of parent elements 1310-1 and 1310-3.

In this example embodiment, reconstruction data for level of quality #1 indicates attribute settings for each parent element 1310. For example, reconstruction data 1305-1 includes one or more symbols specifying settings of parent element 1310-1 in a rendition of the signal at a first level of quality; reconstruction data 1305-1 includes one or more symbol specifying settings of parent element 1310-2; reconstruction data 1305-1 includes one or more symbols specifying settings of parent element 1310-3; reconstruction data 1305-1 includes one or more symbols specifying settings of parent element 1310-4; and so on.

During reconstruction of the signal at the level of quality #2, the signal processor 100-2 divides the parent elements 1310 into multiple sub-elements 1320 as shown. The sub-element 1320-3 of the multiple sub-elements 1320 includes a portion of parent element 1310-1, 1310-2, 1310-3, and 1310-4. In one embodiment, because the sub-element 1320-3 does not fully reside in any one parent element, the signal processor 100-2 derives an attribute setting for the sub-element 1320-3 based on one or more settings (e.g., symbols) associated with parent element 1310-1, one or more settings (e.g., symbols) associated with parent element 1310-2, one or more settings (e.g., symbols) associated with parent element 1310-3, and one or more settings (e.g., symbols) associated with 1310-4.

In one embodiment, inheritance of settings for element 1320-3 are calculated as an average of the settings derived for a set of parent elements including parent element 1310-1, parent element 1310-2, parent element 1310-3, and parent element 1310-4.

In accordance with another embodiment, the sub-element 1320-3 inherits the attribute settings of one of the parent elements depending on which parent element has more area or volume in common with the sub-element 1320-3. In this example, the sub-element 1320-3 inherits settings of parent element 1310-3.

Joint inheritance of settings can vary depending on the embodiment.

For example, in accordance with one embodiment, a decoder can be configured to apply, to each signal element in the higher level, a blending of inherited setting information (e.g., weighted average) from the different parent elements that influence control over it. That is, each of sub-element 1320-5 and sub-element 1320-4 can be configured to inherit settings information derived from a combination of settings associated with parent element 1310-3 and parent element 1310-1; each of sub-element 1320-1 and sub-element 1320-2 can be configured to inherit settings information derived from a combination of settings associated with parent element 1310-2 and parent element 1310-1; sub-element 1320-3 can be configured to inherit settings information derived from a combination of settings associated with parent element 1310-1, 1310-2, 1310-3, and 1310-4.

FIG. 14 is an example diagram illustrating cross inheritance among different setting planes according to embodiments herein.

For example, the signal processor 100-2 can be configured to look at other planes of setting information for the signal element and produce setting information for a given plane based on one or more other planes of setting information (e.g., for tissue type properties in a volumetric medical image it might take the value of the signal element with the most similar color), so that the encoder eliminates the need to sending residuals for all of the different planes.

More specifically, reconstruction data 1450-1 can specify inheritance and settings information associated with level of quality #1; reconstruction data 1450-2 can specify inheritance and settings information associated with level of quality #2; reconstruction data 1450-3 can specify inheritance and settings information associated with level of quality #3; and so on.

In this example embodiment, the rendition of signal for each level of quality is based on separate YUV color plane information (e.g., parameter plane Y, parameter plane U, and parameter plane V).

Assume in this example that there is a correlation between the Y plane (typically the most important for the human eye) and the other two planes U and V. In this instance, many borders and transitions are common. As a consequence, when reconstructing the signal at higher levels of quality of the settings for plane U and plane V (i.e., when inheriting the settings of the lower levels), it is useful to "follow the transitions" defined in the Y plane. In this way, it is possible to define the U and V plane with coarser level of detail (i.e., avoiding to send residual data for the highest levels of quality), but still reconstruct the color transitions in the right image elements even for higher levels of quality.

Accordingly, settings for sub-elements for a given one or more plane (e.g., plane U and plane V) can be derived from settings associated with another controlling plane of information. For example, reconstruction data 1450 can encoded to include parameter plane Y information as discussed herein using inheritance. Because it is known that the settings associated with the sub-elements in the parameter plane U and the parameter plane V are similar to or follow the changes to parameter plane Y, the decoder can be configured to derive a setting value for sub-elements in parameter plane U and/or parameter plane V based on settings for parameter plane Y in lieu of directly receiving attribute setting information for these planes from the reconstruction data. The reconstruction data can include symbols that indicate to the decoder to derive setting information for the parameter plane U and/or parameter plane V based on the settings for parameter plane Y.

Thus, inheritance of information can occur within a respective plane from a parent element to one or more sub-elements. That is, the sub-elements in level of quality #2 can inherit from the parent element in plane Y. Each further sub-element can inherit settings as discussed herein. Inheritance of information also can be across planes as opposed to merely within a given plane. That is, settings for sub-elements at level of quality #2 for plane U can be derived from setting information of the sub-element in level of quality #2 inherited from plane Y; settings for sub-elements at level of quality #2 for plane V can be derived from setting information of the sub-element in level of quality #2 inherited from plane Y, and so on.

Thus, according to embodiments herein, the attribute setting of a parent element as specified by a symbol can be a first setting plane amongst multiple types of setting planes associated with each of the parent element. The signal processor 100-2 can be configured to derive one or more first plane setting values for sub-elements derived from the parent element. The signal processor can be configured to derive setting values for a second setting plane for the respective sub-element based on the setting value of the first setting plane in lieu of directly receiving setting information for the second setting plane from the second set of reconstruction data.

Note again that techniques herein are well suited for use in processing and reconstructing signals. However, it should be noted that embodiments herein are not limited to use in such applications and that the techniques discussed herein are well suited for other applications as well.

Based on the description given herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method of processing a signal in a hierarchy including multiple levels of quality, the method comprising:
   receiving a first set of reconstruction data to reconstruct the signal at a first level of quality, the first set of reconstruction data including a symbol indicating an adjustment value to apply to a preliminary setting of a parent element to produce a modified setting for the parent element during reconstruction of the signal at the first level of quality;
   combining the preliminary setting of the parent element and the adjustment value to produce the modified setting for the parent element at the first level of quality;
   dividing the parent element into multiple sub-elements to reconstruct the signal at a second level of quality, the second level of quality higher than the first level of quality; and
   utilizing the modified setting of the parent element to produce a setting for a respective sub-element in the multiple sub-elements.

2. The method as in claim 1, wherein the symbol specifies that each of the multiple sub-elements and all further divisions of the multiple sub-elements into smaller sub-elements at higher levels of quality also have been assigned the adjustment value as indicated by the symbol assigned to the parent element at the first level of quality.

3. The method as in claim 2, wherein the symbol specifies one of multiple class types to which the parent element belongs.

4. The method as in claim 2, wherein the symbol specifies one of multiple class types to which the parent element belongs and that sets of reconstruction data to reconstruct the signal at levels of quality higher than the first level of quality do not include a transmission or duplication of the symbol for the parent element, since the symbol indicates that each of the multiple sub-elements and all further divisions of the multiple sub-elements into smaller sub-elements at higher levels of quality inherit the adjustment value as indicated by the symbol assigned to the parent element at the first level of quality.

5. The method as in claim 1 further comprising:
   receiving a second set of reconstruction data to reconstruct the signal at the second level of quality, the second set of reconstruction data including a symbol specifying settings of sub-elements derived from the parent element in the rendition of the signal at the first level of quality, the symbol in the second set of reconstruction data being an inherit marker indicating that the sub-element inherits the adjustment value assigned to the parent element as specified by the symbol.

6. The method as in claim 1, wherein the symbol is selected from multiple symbols, a first set of the multiple symbols configured to indicate assignment of a first class type, a second set of the multiple symbols allocated to indicate assignment of a second class type, the symbol assigned to the parent element indicating a class type of the parent element.

7. The method as in claim 6, wherein the first set of symbols includes at least a first symbol and a second symbol;
   wherein assignment of the first symbol in the first set indicates that a respective element is assigned the first class type and that at least one sub-element derived from the respective element at a higher level of quality is assigned to a different class than the first class type; and
   wherein assignment of the second symbol in the first set indicates that a respective element is assigned the first class type and that all sub-elements derived from the respective element at a higher level of quality inherit the first class type.

8. The method as in claim 7, wherein the second set of symbols includes at least a first symbol and a second symbol;
   wherein assignment of the first symbol in the second set indicates that a respective element is assigned the second class type and that the at least one sub-element derived from the respective element at a higher level of quality is assigned to a different class that the second class type; and
   wherein assignment of the second symbol in the second set indicates that a respective element is assigned to the second class type and that all sub-elements derived from the respective element at a higher level of quality inherit the second class type.

9. The method as in claim 8, wherein reconstruction data to reconstruct the signal at each of multiple higher levels of quality indicates a probability distribution of the multiple symbols including the first set of symbols and the second set of symbols.

10. The method as in claim 8, wherein assignment of the second symbol in the first set or assignment of the second symbol in the second set to the parent element indicates that reconstruction data to reconstruct the signal at higher levels of quality will not include information indicating a class type to which any sub-elements derived from the parent belong and that the sub-elements are assigned to a type as indicated by the symbol.

11. The method as in claim 1, wherein the symbol assigned to the parent element indicates that the parent element belongs to a first class type, the method further comprising:
receiving a second set of reconstruction data to reconstruct the signal at the second level of quality, the second set of reconstruction data including a symbol assigned to a first sub-element of the multiple sub-elements, the symbol assigned to the first sub-element specifying that the first sub-element belongs to a second class type differing from the class type of the parent element.

12. The method as in claim 11, wherein the second set of reconstruction data includes a symbol assigned to a second sub-element of the multiple sub-elements, the symbol assigned to the second sub-element specifying that the second sub-element belongs to the first class type.

13. The method as in claim 1,
wherein the symbol indicates that each of the multiple sub-elements and all further divisions of the multiple sub-elements into smaller sub-elements at higher levels of quality are assigned a same adjustment value setting or the same final value setting as indicated by the symbol assigned to the parent element at the first level of quality.

14. The method as in claim 13, wherein the symbol indicates that the adjustment is to be inherited by each of the multiple sub-elements and all further divisions of the multiple sub-elements into smaller sub-elements at higher levels of quality, and that sets of reconstruction data to reconstruct the signal at levels of quality higher than the first level of quality do not include a transmission or duplication of the symbol.

15. The method as in claim 1 further comprising:
receiving a second set of reconstruction data to reconstruct the signal at the second level of quality, the second set of reconstruction data including a symbol specifying settings of sub-elements derived from a corresponding parent element in the rendition of the signal at the first level of quality, the symbol in the second set of reconstruction data being an inherit marker indicating that the sub-elements inherit the adjustment value settings assigned to the corresponding parent element.

16. The method as in claim 1, wherein the symbol is selected from multiple symbols, each symbol in a first set of the multiple symbols configured to indicate a different respective adjustment value in a range of adjustment values, each symbol in a second set of adjustment values configured to indicate different respective adjustment values in the range;
assignment of a respective symbol in the first set of symbols indicating that each of the multiple sub-elements and all further divisions of the multiple sub-elements derived from the parent element into smaller sub-elements at higher levels of quality is assigned different adjustment values as specified by symbols in sets of reconstruction data indicating how to reconstruct the signal at levels of quality higher than the first level of quality; and
assignment of a respective symbol in the second set of symbols indicating that each of the multiple sub-elements and all further divisions of the multiple sub-elements derived from the parent element into smaller sub-elements at higher levels of quality are assigned the same value as the respective symbol and that strings of reconstruction data to reconstruct the signal at levels of quality higher than the first level of quality do not include a transmission or duplication of the respective adjustment values associated to each of the multiple sub-elements.

17. The method as in claim 1 further comprising:
wherein the first set of reconstruction data includes a first symbol specifying an attribute setting of a first parent element in the rendition of the signal at the first level of quality, the first set of reconstruction data including a second symbol specifying an attribute setting of a second parent element in the rendition of the signal at the first level of quality;
dividing the first parent element and the second parent element into respective multiple sub-elements to reconstruct the signal at a second level of quality, the second level of quality higher than the first level of quality, a given sub-element of the multiple sub-elements including a portion of the first parent element and a portion of the second parent element; and
deriving an attribute setting for the given sub-element based on the first symbol and the second symbol.

18. The method as in claim 17, wherein the given sub-element inherits the attribute setting of the first parent element or the second parent element depending on which parent element has more area or volume in common with the given sub-element.

19. The method as in claim 1, wherein the attribute setting of the parent element as specified by the symbol is a first setting plane amongst multiple types of setting planes associated with each of the parent element and the respective sub-element, the method further comprising:
deriving a setting value for the first setting plane for the respective sub-element; and
deriving a setting value for a second setting plane for the respective sub-element based on the setting value in the first setting plane in lieu of directly receiving setting information for the second setting plane from the second set of reconstruction data.

20. Computer readable hardware storage having instructions stored thereon, the instructions, when carried out by a processing device, causing the processing device to perform operations of:
receiving a first set of reconstruction data to reconstruct the signal at a first level of quality, the first set of reconstruction data including a symbol indicating an adjustment value to apply to a preliminary setting of a parent element to produce a modified setting for the parent element during reconstruction of the signal at the first level of quality;
dividing the parent element into multiple sub-elements to reconstruct the signal at a second level of quality, the second level of quality higher than the first level of quality; and
utilizing the modified setting of the parent element to produce a setting for a respective sub-element in the multiple sub-elements.

21. A computer system comprising:
a processor;
a memory unit that stores instructions associated with an application executed by the processor; and
an interconnect coupling the processor and the memory unit, causing the computer system to execute the application and perform operations of:
receiving a first set of reconstruction data to reconstruct the signal at a first level of quality, the first set of reconstruction data including a symbol indicating an adjustment value to apply to a preliminary setting of a parent element to produce a modified setting of the parent element during reconstruction of the signal at the first level of quality;
combining the preliminary setting of the parent element and the adjustment value to produce the modified setting of the parent element at the first level of quality;
dividing the parent element into multiple sub-elements to reconstruct the signal at a second level of quality, the second level of quality higher than the first level of quality; and
utilizing the modified setting of the parent element to produce a setting for a respective sub-element in the multiple sub-elements.

22. The method as in claim 1, wherein reconstruction data to reconstruct the signal at each of multiple higher levels of quality above the first level of quality indicates a probability distribution of multiple symbols including a first set of symbols and a second set of symbols.

23. The method as in claim 1 further comprising: utilizing the adjustment value to modify upsampled sub-elements until a subsequent set of reconstruction data to reconstruct the signal at a higher level of quality specifies a different adjustment value for application to respective sub-elements.

24. The method as in claim 1, wherein reconstruction data received to reconstruct the second level of quality specifies adjustment values only for a subset of the elements of the rendition of the signal at the second level of quality, the method comprising:
reconstructing the signal at a first level of quality, wherein elements of said signal at the first level of quality are assigned either a symbol belonging to a first set of symbols or a symbol belonging to a second set of symbols;
generating a preliminary rendition of the signal at the second level of quality, wherein elements of said preliminary rendition at the second level of quality corresponding to a same parent element of the signal at the first level of quality are assigned a symbol as specified by the symbol of said parent element of the signal at the first level of quality;
receiving reconstruction data corresponding to adjustments of the preliminary rendition of the signal at the second level of quality;
only for elements of the preliminary rendition of the signal at the second level of quality that were assigned a symbol belonging to the second set of symbols, modifying the assigned symbol based on said received reconstruction data.

25. The method as in claim 1, wherein the signal represents an image.

26. The method as in claim 1, wherein the signal represents descriptive information on motion.

27. The method as in claim 1, wherein the signal represents information on indicating upsampling operations used to generate, based on a rendition of an image at a first level of quality, a preliminary rendition of the image at a second level of quality.

28. The method as in claim 1, wherein the signal is represents a three-dimensional volume.

29. The method as in claim 1, wherein the symbol is selected from multiple symbols, a first set of the multiple symbols configured to indicate assignment of a first class type, the second set of the multiple symbols allocated to indicate assignment to a second class type, the symbol assigned to the parent element indicating a class type of the parent element.

30. The method as in claim 29 further comprising:
utilizing the modified setting of the parent element to reconstruct a rendition of the signal at the first level of quality; and
responsive to detecting that the symbol belongs to the first class type, utilizing the adjustment value of the parent element as specified by the symbol to produce a default symbol of the first class type for adjustments to the multiple sub-elements.

31. The method as in claim 29, wherein the symbol specifies that each of the multiple sub-elements and all further divisions of the multiple sub-elements into smaller sub-elements at higher levels of quality have been assigned the adjustment value as indicated by the symbol assigned to the parent element at the first level of quality.

32. The method as in claim 31 further comprising:
receiving a second set of reconstruction data to reconstruct the signal at a second level of quality, the second set of reconstruction data indicating adjustment values only for sub-elements of corresponding parent elements that at the first level of quality were assigned a symbol of the second class type; and
reconstructing a rendition of the signal at the second level of quality.

33. The method as in claim 1, wherein the reconstruction data indicates an entropy associated with symbols assigned to parent elements at the first level of quality, each of the symbols indicating a class to which the respective element belongs as well as which sub-elements derived from the respective parent element inherits same setting information as the parent.

34. The method as in claim 1, wherein the symbol indicating the adjustment value is a numerical value representing residual data, the numerical value specifying an amount in which to modify the preliminary setting of the parent element.

35. The method as in claim 34, wherein the numerical value specifies a polarity in which to modify the preliminary setting of the parent element.

36. The method as in claim 1, wherein the symbol is a first symbol, the method further comprising:
receiving a second set of reconstruction data to reconstruct the signal at the second level of quality, the second set of reconstruction data including a second symbol, the second symbol indicating an adjustment value to apply to a preliminary setting of a given sub-element of the multiple sub-elements to produce a modified setting for the given sub-element during reconstruction of the signal at the second level of quality;
dividing the given sub-element into multiple sub-sub-elements to reconstruct the signal at a third level of quality, the third level of quality higher than the second level of quality; and
utilizing the modified setting of the given sub-element as a default attribute setting for a respective sub-sub-element in the multiple sub-sub-elements.

37. The computer system as in claim 21, wherein execution of the application further comprises:
   utilizing the symbol of the parent element to produce an adjustment value for the respective sub-element, the adjustment value indicating an adjustment to be made to the produced setting for the respective sub-element.

38. The computer system as in claim 21 further comprising:
   combining the preliminary setting of the parent element and the adjustment value to produce the modified setting of the parent element at the first level of quality.

39. The method as in claim 1 further comprising:
   utilizing the symbol of the parent element to produce an adjustment value for the respective sub-element, the adjustment value indicating an adjustment to be made to the produced setting for the respective sub-element; and
   combining the produced setting for the respective sub-element and the adjustment value to produce a modified setting of the respective sub-element at the second level of quality.

40. The method as in claim 39, wherein the symbol indicates that the adjustment value has been assigned to the respective sub-element.

41. The method as in claim 40, wherein the parent element is a first parent element; and
   wherein producing the setting of the sub-element includes:
      producing the setting of the sub-element to inherit settings associated with the first parent element and a second parent element at the first level of quality.

* * * * *